(12) United States Patent
Chiang et al.

(10) Patent No.: US 10,755,068 B2
(45) Date of Patent: Aug. 25, 2020

(54) FINGERPRINT REGISTRATION METHOD AND ELECTRONIC DEVICE USING THE SAME

(71) Applicant: Egis Technology Inc., Taipei (TW)

(72) Inventors: Yuan-Lin Chiang, Taipei (TW); Yuan-Chang Fan, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 16/360,017

(22) Filed: Mar. 21, 2019

(65) Prior Publication Data

US 2019/0220646 A1     Jul. 18, 2019

Related U.S. Application Data

(63) Continuation-in-part of application No. 16/105,987, filed on Aug. 21, 2018.
(Continued)

(30) Foreign Application Priority Data

Apr. 18, 2018   (CN) .......................... 2018 1 0349409
Nov. 21, 2018   (TW) .............................. 107141438 A

(51) Int. Cl.
*G06T 9/00*      (2006.01)
*G06K 9/00*      (2006.01)
(Continued)

(52) U.S. Cl.
CPC ..... *G06K 9/00026* (2013.01); *G06K 9/00067* (2013.01); *G06K 9/036* (2013.01);
(Continued)

(58) Field of Classification Search
USPC .................................................. 382/124, 125
See application file for complete search history.

(56) References Cited

U.S. PATENT DOCUMENTS 9,898,642 B2    2/2018  Han et al.
2003/0123715 A1  7/2003  Uchida
(Continued)

FOREIGN PATENT DOCUMENTS

CN    1668244    9/2005
CN    1758265    4/2006
(Continued)

OTHER PUBLICATIONS

"Office Action of Taiwan Counterpart Application," dated Aug. 16, 2019, p. 1-p. 8.
(Continued)

*Primary Examiner* — Leon Viet Q Nguyen
(74) *Attorney, Agent, or Firm* — JCIPRNET

(57) ABSTRACT

A fingerprint registration method and an electronic device using the same are provided. The fingerprint registration method includes the following steps: sequentially obtaining a plurality of swipe frames of a fingerprint by a fingerprint sensor; sequentially analyzing the swipe frames by a processor to obtain a plurality of feature points; sequentially merging the feature points of the swipe frames into pre-registration data by the processor; sequentially updating a completion area displayed on a user interface by the processor according to relative position relationships of the feature points of the swipe frames; and determining whether the pre-registration data satisfies a preset completion condition by the processor, so as to determine whether to end the fingerprint registration.

10 Claims, 17 Drawing Sheets

Related U.S. Application Data

(60) Provisional application No. 62/573,140, filed on Oct. 16, 2017, provisional application No. 62/598,480, filed on Dec. 14, 2017, provisional application No. 62/656,367, filed on Apr. 12, 2018, provisional application No. 62/660,268, filed on Apr. 20, 2018.

(51) Int. Cl.
*G06K 9/03* (2006.01)
*G06T 7/33* (2017.01)
*G06K 9/62* (2006.01)
*G06T 7/246* (2017.01)

(52) U.S. Cl.
CPC ......... *G06K 9/6202* (2013.01); *G06K 9/6261* (2013.01); *G06T 7/246* (2017.01); *G06T 7/33* (2017.01)

(56) References Cited

U.S. PATENT DOCUMENTS

| | | | | |
|---|---|---|---|---|
| 2009/0214083 | A1* | 8/2009 | Sato | G06K 9/00026 382/107 |
| 2015/0146945 | A1 | 5/2015 | Han et al. | |
| 2016/0117545 | A1 | 4/2016 | Chiang et al. | |
| 2016/0203354 | A1 | 7/2016 | Choi et al. | |
| 2016/0321494 | A1* | 11/2016 | Shin | G06F 21/32 |
| 2017/0039409 | A1 | 2/2017 | Han et al. | |
| 2017/0083741 | A1* | 3/2017 | Gao | G06K 9/00912 |

FOREIGN PATENT DOCUMENTS

| | | |
|---|---|---|
| CN | 1924889 | 3/2007 |
| CN | 103077377 | 7/2015 |
| TW | 200412548 | 7/2004 |
| TW | 200828135 | 7/2008 |
| TW | 201617836 | 5/2016 |

OTHER PUBLICATIONS

"International Search Report (Form PCT/ISA/210) of PCT/CN2019/082121," dated Jul. 8, 2019, pp. 1-4.

"Written Opinion of the International Searching Authority (Form PCT/ISA/237) of PCT/CN2019/082121," dated Jul. 8, 2019, pp. 1-4.

* cited by examiner

FINGERPRINT REGISTRATION METHOD AND ELECTRONIC DEVICE USING THE SAME

CROSS-REFERENCE TO RELATED APPLICATION

This application is a continuation-in-part application of and claims the priority benefit of U.S. application Ser. No. 16/105,987, filed on Aug. 21, 2018, now pending. The prior U.S. application Ser. No. 16/105,987 claims the priority benefits of U.S. provisional application Ser. No. 62/573,140, filed on Oct. 16, 2017, U.S. provisional application Ser. No. 62/598,480, filed on Dec. 14, 2017, and China application serial no. 201810349409.2, filed on Apr. 18, 2018. This application also claims the priority benefits of U.S. provisional application Ser. No. 62/656,367, filed on Apr. 12, 2018, U.S. provisional application Ser. No. 62/660,268, filed on Apr. 20, 2018, and Taiwan application serial no. 107141438, filed on Nov. 21, 2018. The entirety of each of the above-mentioned patent applications is hereby incorporated by reference herein and made a part of specification.

BACKGROUND

Technical Field

The invention relates to a fingerprint analysis technique, and particularly relates to a fingerprint registration method and an electronic device using the fingerprint registration method.

Description of Related Art

In recent years, fingerprint identification technology is widely used in various electronic devices to provide various identity login or identity verification functions. However, the general fingerprint identification technology is to implement fingerprint registration in a manner of one pressing or multiple pressings as a user presses a finger on a fingerprint sensor, and to provide a corresponding user interface to inform the user of a progress of fingerprint registration. For example, if the fingerprint is registered in the manner of multiple pressings, each time when the user presses, a corresponding fingerprint image displayed on the user interface increases, and until the whole fingerprint or a large enough range of the fingerprint is displayed, the fingerprint registration is completed.

SUMMARY

The invention is directed to a fingerprint registration method and an electronic device using the fingerprint registration method, where during a process of fingerprint registration, the user may slide the finger towards any direction, and the invention is adapted to provide a real-time information of fingerprint registration progress to the user according to a finger sliding direction and the sensed fingerprint information and generate fingerprint registration data.

The invention provides a fingerprint registration method adapted to an electronic device. The electronic device includes a processor, a fingerprint sensor and a display. The fingerprint registration method includes: sequentially obtaining a plurality of swipe frames of a finger object by a fingerprint sensor; sequentially analyzing the swipe frames by the processor to obtain a plurality of feature points of the swipe frames; sequentially merging the feature points of the swipe frames into pre-registration data by the processor; sequentially updating a completion area displayed on a user interface of the display by the processor according to relative position relationships of the feature points of the swipe frames; and determining whether the pre-registration data satisfies a preset completion condition by the processor, so as to determine whether to end the fingerprint registration.

The invention provides an electronic device including a fingerprint sensor, a processor and a display. The fingerprint sensor is configured to sequentially obtain a plurality of swipe frames of a finger object. The processor is coupled to the fingerprint sensor. The processor is configured to sequentially analyze the swipe frames to obtain a plurality of feature points of the swipe frames. The display is coupled to the processor. The processor sequentially merges the feature points of the swipe frames into pre-registration data. The processor sequentially updates a completion area displayed on a user interface of the display according to relative position relationships of the feature points of the swipe frames. The processor determines whether the pre-registration data satisfies a preset completion condition, so as to determine whether to end the fingerprint registration.

Based on the above description, the fingerprint registration method and the electronic device using the fingerprint registration method of the invention are adapted to produce the pre-registration data and display the completion area on the user interface according to the feature points of the swipe frames, and are adapted to correspondingly display the gradually expanded completion area on the user interface according to the swipe operation of the finger object on the fingerprint sensor. Therefore, the fingerprint registration method and the electronic device using the fingerprint registration method are adapted to provide real-time information of fingerprint registration progress and produce fingerprint registration data.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
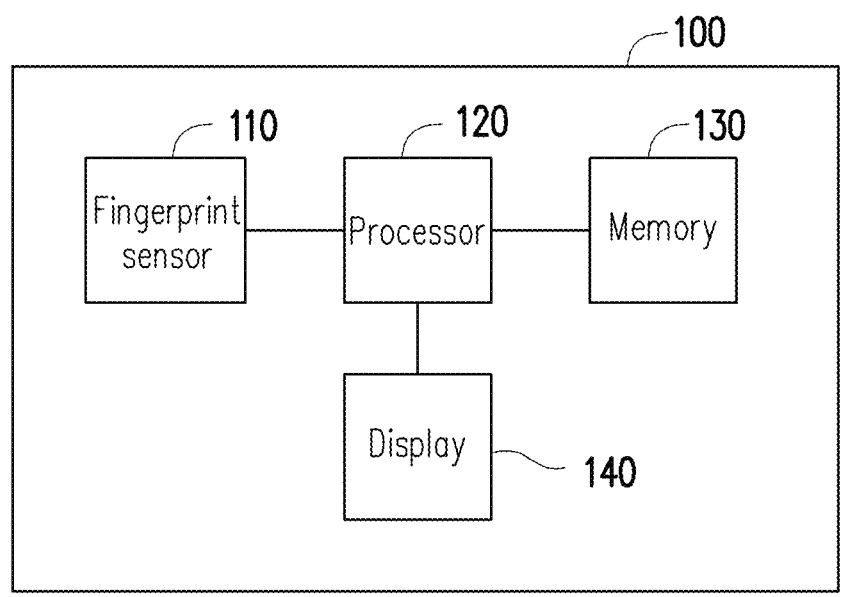
FIG. 1 is a schematic diagram of a fingerprint registration device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an electronic device 100 according to an embodiment of the invention. Referring to FIG. 1, the electronic device 100 includes a fingerprint sensor 110, a processor 120, a memory 130 and a display 140. Only simplified blocks of components related to the invention are illustrated in FIG. 1. However, the invention is not limited to the content shown in FIG. 1. Moreover, in the embodiment, the fingerprint sensor 110 has a sensing area of n×m mm$^2$ (square millimeters). For example, the sensing area of the fingerprint sensor 110 may be 10 mm×4 mm, 6 mm×6 mm, or 4 mm×3.2 mm.

In the embodiment, when the electronic device 100 performs fingerprint registration, the user is required to swipe a finger on the fingerprint sensor 110. The user places the finger on the fingerprint sensor 110, and slides towards any direction. When the finger of the user swipes on the fingerprint sensor 110, the fingerprint sensor 110 obtains a plurality of swipe frames one-by-one. To be specific, the electronic device 100 may display a user interface having a fingerprint reference image on the display 140. When the finger of the user swipes on the fingerprint sensor 110 to perform the fingerprint registration, the fingerprint sensor 110 obtains a first swipe frame, and the processor 120 accordingly analyzes the first swipe frame to obtain a plurality of feature points of the first swipe frame. The processor 120 displays a completion area in the fingerprint reference image according to the feature points of the first swipe frame. Then, the fingerprint sensor 110 obtains a second swipe frame, and the processor 120 analyzes the second swipe frame to accordingly obtain a plurality of feature points of the second swipe frame. The processor 120 increases a range of the completion area in the fingerprint reference image according to the feature points of the second swipe frame. Deduced by analogy, the fingerprint sensor 110 may continually and sequentially obtain a plurality of swipe frames for analyzing one-by-one. Namely, the electronic device 100 may display the user interface having the fingerprint reference image on the display 140, and the range of the completion area displayed in the fingerprint reference image is correspondingly expanded along with the increase of the obtained swipe frames and feature points.

Figure 2:
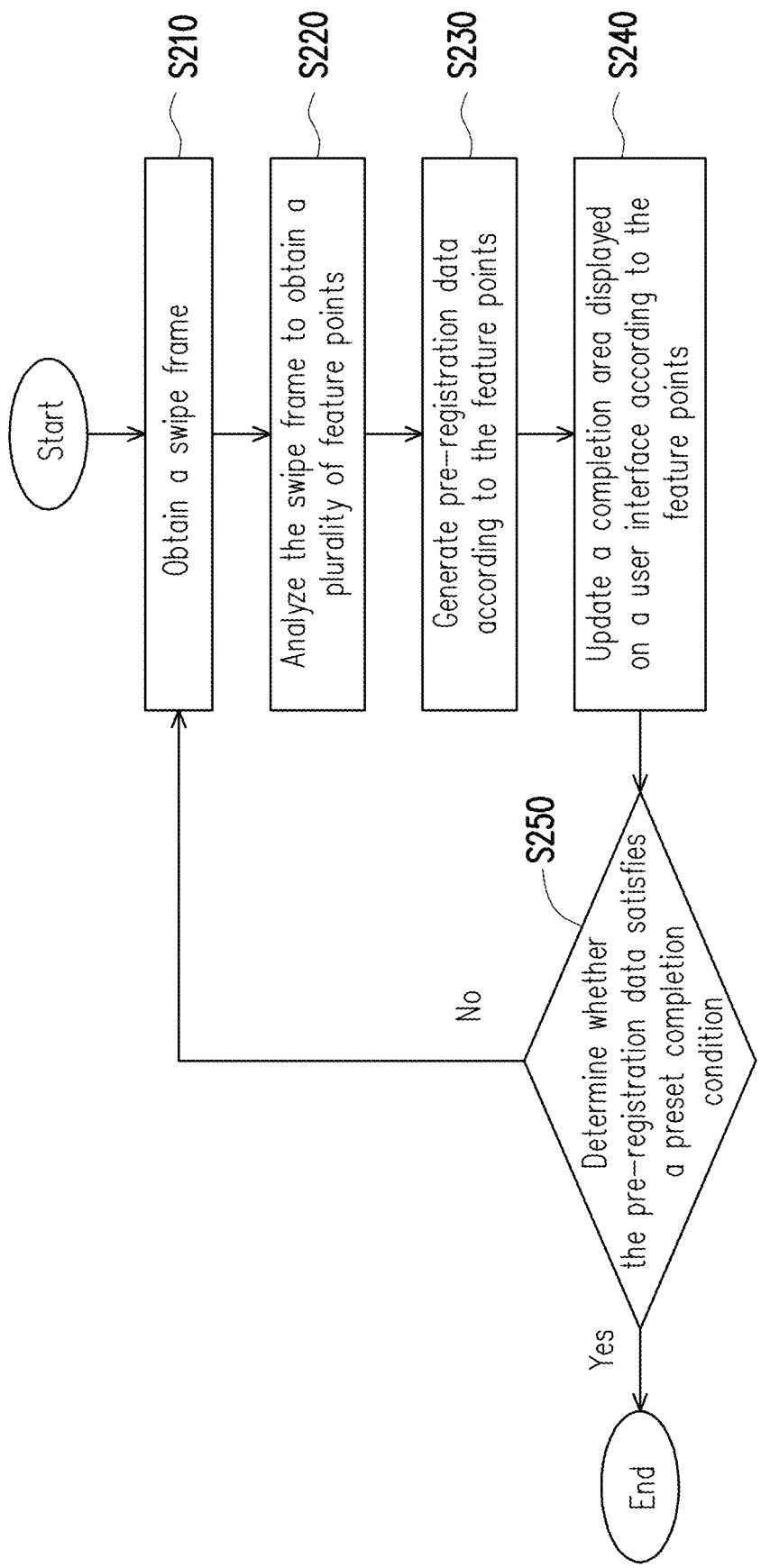
FIG. 2 is a flowchart illustrating a fingerprint registration method according to an embodiment of the invention.

FIG. 2 is a flowchart illustrating a fingerprint registration method according to an embodiment of the invention. In the embodiment, when the electronic device 100 performs the fingerprint registration, the user is required to place the finger on the fingerprint sensor 110 to perform a swipe operation. Namely, user places the finger on the fingerprint sensor 110, and slides towards any direction. Referring to FIG. 1 and FIG. 2, in step S210, the fingerprint sensor 110 obtains a swipe frame of the finger. In step S220, the processor 120 analyzes the swipe frame to obtain a plurality of feature points. In step S230, the processor 120 generates pre-registration data according to the feature points. In step S240, the processor 120 updates a completion area displayed on the user interface according to the feature points. In step S250, the processor 120 determines whether the pre-registration data satisfies a preset completion condition. If yes, the processor 120 stores the pre-registration data as fingerprint registration data, and ends the fingerprint registration. If not, the processor 120 executes step S210 to continually obtain the swipe frames in sequence through the fingerprint sensor 110.

In other words, the fingerprint registration method of the embodiment may correspondingly update the range of the completion area on the user interface according to the newly added fingerprint feature points, so as to provide real-time information of fingerprint registration progress, and determine whether to end the fingerprint registration according to whether the pre-registration data satisfies the preset completion condition. Moreover, it should be noted that the above preset completion condition refers to that when the processing unit 120 determines that the number, a data amount, a coverage area, a width and/or a height of the feature points in the pre-registration data are greater than pre-registration thresholds, the processing unit 120 ends the fingerprint registration, and stores the pre-registration data as the fingerprint registration data, or generates the fingerprint registration data according to the pre-registration data and stores the same in the memory 130.

Moreover, according to step S220 of FIG. 2, the processor 120 may analyze the swipe frame to obtain a plurality of feature points. However, in some embodiments, before the processor 120 obtains the plurality of feature points, the processor 120 first performs distortion correction on the swipe frame, and then extracts the feature points from the corrected swipe frame, which is described below with reference to the embodiments of FIG. 3, FIG. 4A and FIG. 4B.

Figure 3:
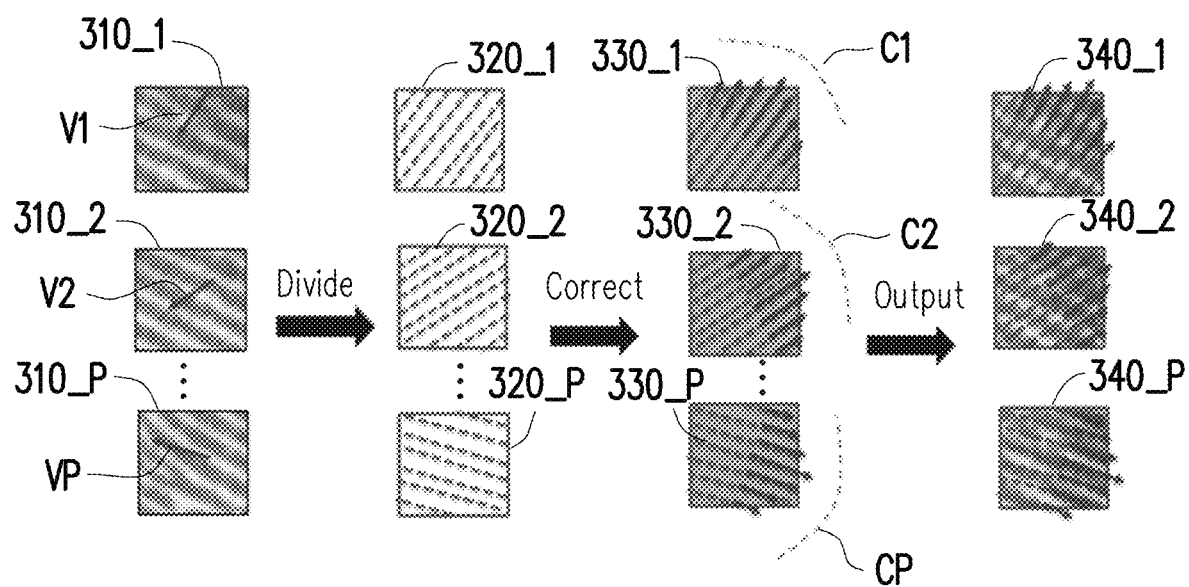
FIG. 3 is a schematic diagram of correcting swipe frames according to an embodiment of the invention.

FIG. 3 is a schematic diagram of correcting swipe frames according to an embodiment of the invention. Referring to FIG. 1 and FIG. 3, when the electronic device 100 performs fingerprint registration, the user is required to swipe the finger on the fingerprint sensor 110. To be specific, first, the fingerprint sensor 110 obtains a first swipe frame 310_1, and the processor 120 analyzes the swipe frame 310_1 to obtain a plurality of feature points of the swipe frame 310_1. Then, the fingerprint sensor 110 obtains a second swipe frame 310_2, and the processor 120 analyzes the swipe frame 310_2 to obtain a plurality of feature points of the swipe frame 310_2. In the embodiment, the processor 120 may compare the positions of the same feature points in the swipe frame 310_1 and the swipe frame 310_2 to obtain a displacement amount and a displacement direction of the same feature points in the swipe frame 310_1 and the swipe frame 310_2, so as to generate a motion vector V1 used for correcting the swipe frame 310_1. If the swipe frame 310_1 and the swipe frame 310_2 have a plurality of the same feature points, i.e. multiple feature points are repeatedly appeared in the swipe frame 310_1 and the swipe frame 310_2, the processor 120 takes an average of the displacement amounts and the displacement directions of the same feature points as the motion vector V1. Alternatively, the processor 120 may take the displacement amount and the displacement direction of the feature point repeatedly appeared and having the highest similarity in the swipe frame 310_1 and the swipe frame 310_2 as the motion vector V1.

In the embodiment, when the processor 120 generates the motion vector V1 used for correcting the swipe frame 310_1, the processor 120 divides the swipe frame 310_1 along the direction of the motion vector V1, so as to generate a divided swipe frame 320_1 having a plurality of sub-swipe frames. The processor 120 may align the sub-swipe frames of the divided swipe frame 320_1 with a preset Gaussian curve C1, so as to generate an aligned swipe frame 330_1, and outputs the aligned swipe frame 330_1 as a corrected swipe frame 340_1. As shown in FIG. 3, the sub-swipe frames of the divided swipe frame 320_1 are arranged in a direction opposite to the direction of the motion vector V1 according to the Gaussian curve C1. Then, the processor 120 analyzes the corrected swipe frame 340_1 to obtain a plurality of feature points of the corrected swipe frame 340_1. In other words, before the processor 120 of the embodiment extracts the feature points of the swipe frame to generate the pre-registration data, the processor 120 may first perform distortion correction on the swipe frames, so as to eliminate or reduce the distortion caused by swiping. Then, the processor 120 updates (or expands) the completion area displayed on the user interface according to the feature points.

Then, the fingerprint sensor 110 may obtain a third swipe frame 310_3, and the processor 120 may analyze the swipe frame 310_3 to obtain a plurality of feature points of the swipe frame 310_3. In the embodiment, the processor 120 may compare positions of the same feature points in the swipe frame 310_2 and the swipe frame 310_3 to obtain a displacement amount and a displacement direction of the same feature points in the swipe frame 310_2 and the swipe frame 310_3, so as to generate a motion vector V2 used for correcting the swipe frame 310_2. The processor 120 may divide the swipe frame 310_2 along the direction of the motion vector V2, so as to generate a divided swipe frame 320_2 having a plurality of sub-swipe frames. The processor 120 may align the sub-swipe frames of the divided swipe frame 320_2 with a preset Gaussian curve C2, so as to generate an aligned swipe frame 330_2, and outputs the aligned swipe frame 330_2 as a corrected swipe frame 340_2. As shown in FIG. 3, the sub-swipe frames of the divided swipe frame 320_2 are arranged in a direction opposite to the direction of the motion vector V2 according to the Gaussian curve C2. Then, the processor 120 analyzes the corrected swipe frame 340_2 to obtain a plurality of feature points of the corrected swipe frame 340_2. Deduced by analogy, the processor 120 may obtain a plurality of swipe frames 310_1-310_P one-by-one when the user swipes the finger on the fingerprint sensor 110, and may respectively perform opposite-direction alignment on the sub-swipe frames of the swipe frames 310_1-310_P according to the motion vectors and the Gaussian curves corresponding to the swipe frames 310_1-310_P.

Figure 4A:
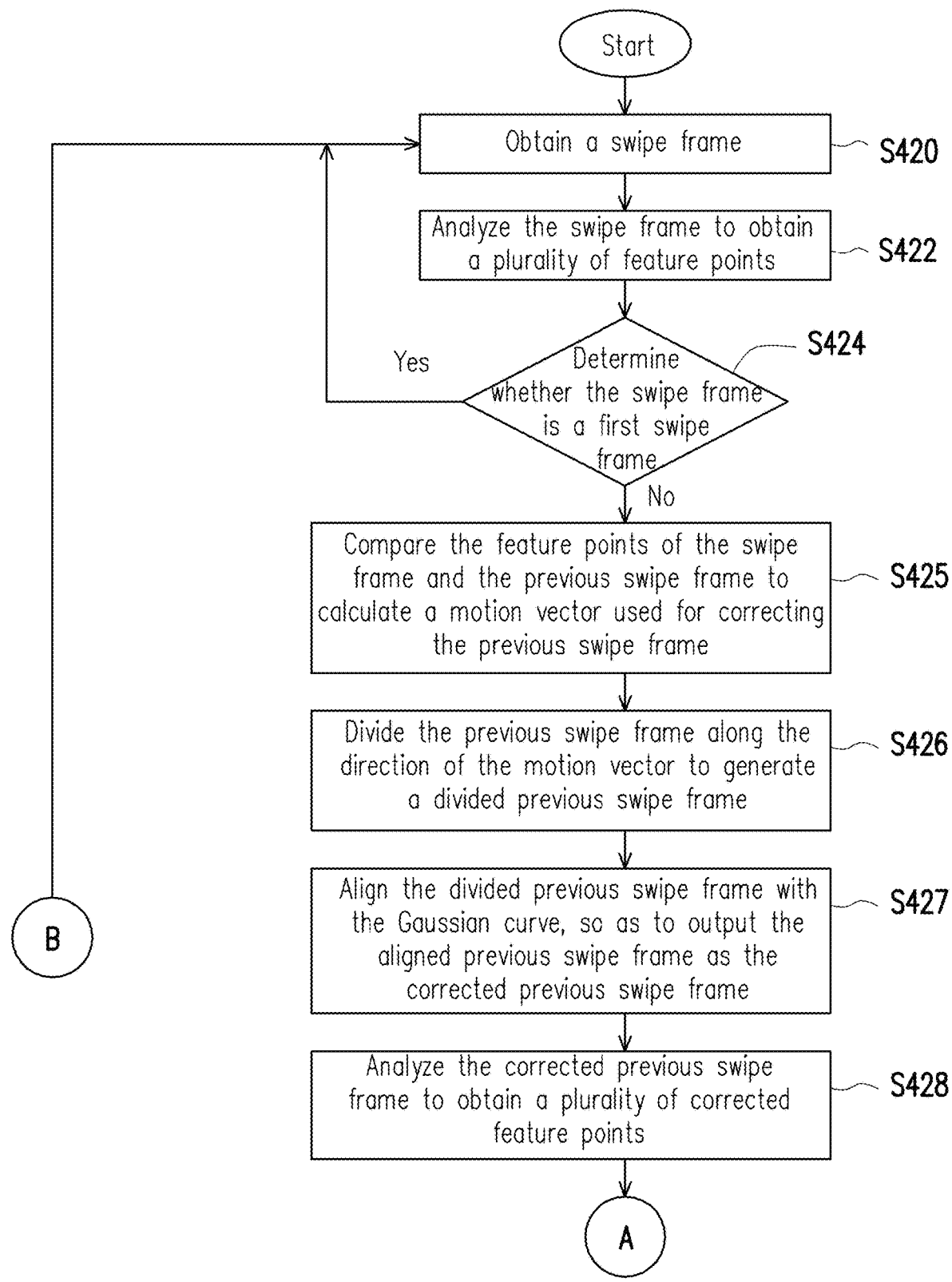
FIG. 4A and FIG. 4B are flowcharts illustrating a method for correcting the swipe frames according to the embodiment of FIG. 3.
Figure 4B:
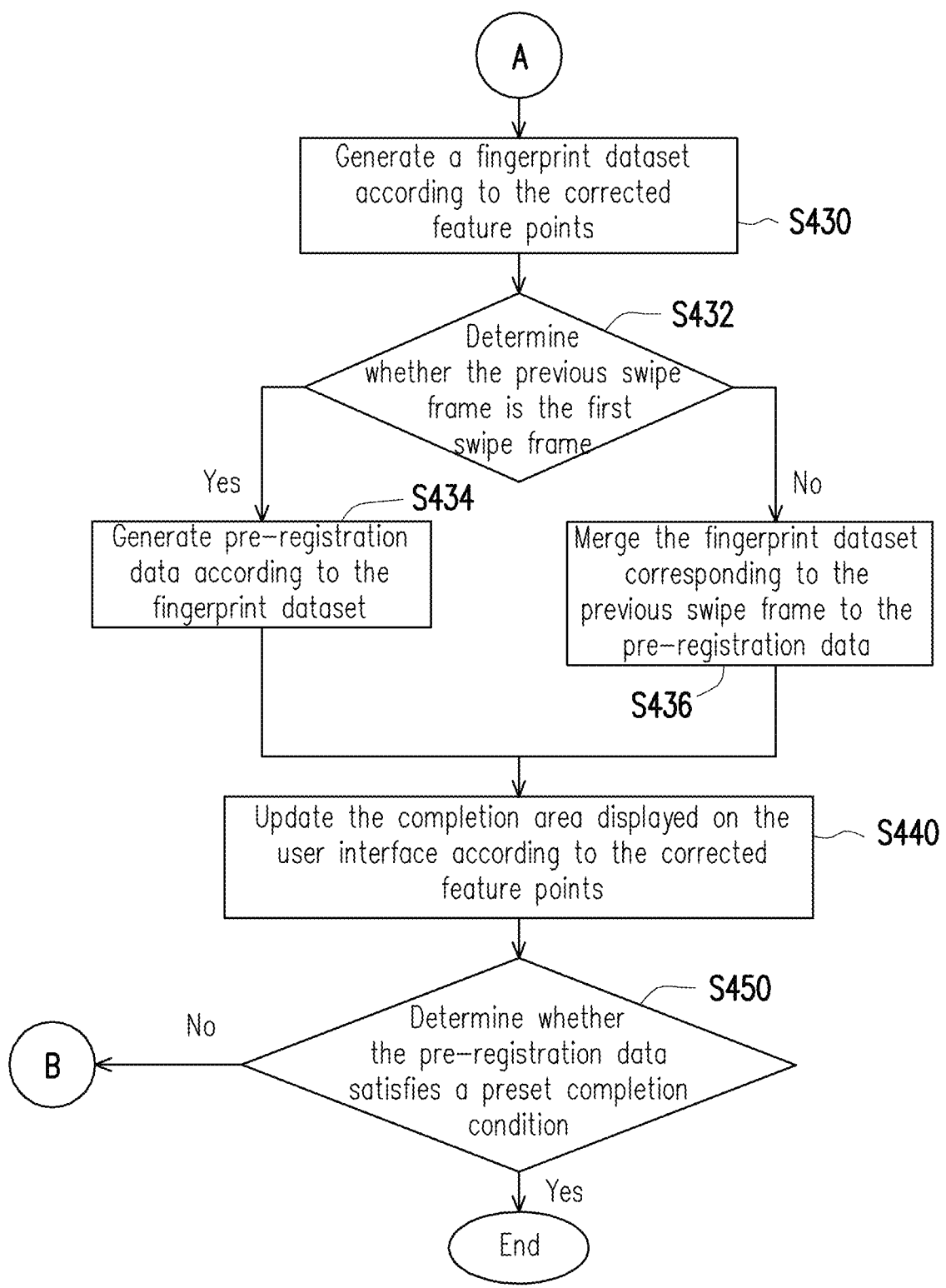

FIG. 4A and FIG. 4B are flowcharts illustrating a method for correcting the swipe frames according to the embodiment of FIG. 3. Referring to FIG. 1, FIG. 3, FIG. 4A and FIG. 4B, in the embodiment, the processor 120 of the electronic device 100 performs correction on the swipe frames 310_1-310_P sequentially obtained by the fingerprint sensor 110 in a one-by-one manner, where P is a positive integer greater than 0. In the embodiment, the processor 120 may sequentially execute following steps S420-S450. The following description begins with the obtaining of the first swipe frame. In step S420, the processor 120 obtains the swipe frame 310_1 through the fingerprint sensor 110. In step S422, the processor 120 analyzes the swipe frame 310_1 to obtain a plurality of feature points of the swipe frame 310_1. In step S424, the processor 120 determines that the swipe frame 310_1 is the first swipe frame, and the processor 120 re-executes the step S420. In step S420, the processor 120 obtains the swipe frame 310_2 through the fingerprint sensor 110. In the step S422, the processor 120 analyzes the swipe frame 310_2 to obtain a plurality of feature points of the swipe frame 310_2. In step S424, the processor 120 determines that the swipe frame 310_2 is not the first swipe frame, and the processor 120 executes a step S425.

In step S425, the processor 120 compares the feature points of the swipe frame 310_2 and the previous swipe frame 310_1 to calculate the motion vector V1 used for correcting the previous swipe frame 310_1. In step S426, the processor 120 divides the previous swipe frame 310_1 along the direction of the motion vector V1 to generate the divided previous swipe frame 320_1. In step S427, the processor 120 aligns the divided previous swipe frame 320_1 with the Gaussian curve C1, so as to output the aligned previous swipe frame 330_1 as the corrected previous swipe frame 340_1. In step S428, the processor 120 analyzes the corrected previous swipe frame 340_1 to obtain a plurality of corrected feature points.

In step S430, the processor 120 generates a fingerprint dataset according to the corrected feature points. In step S432, the processor 120 determines whether the previous swipe frame 310_1 is the first swipe frame, and if yes, the processor 120 executes step S434. In step S434, the processor 120 generates pre-registration data according to the fingerprint dataset, and executes step S440. After obtaining the swipe frame 310_3, in step S432, the processor 120 determines whether the previous swipe frame 310_2 is the first swipe frame, and if not, the processor 120 executes step S436. In step S436, the processor 120 merges the fingerprint dataset corresponding to the previous swipe frame 310_2 into the pre-registration data, and executes step S440.

In step S440, the processor 120 updates the completion area displayed on the user interface according to the corrected feature points. In step S450, the processor 120 determines whether the pre-registration data satisfies a preset completion condition. If yes, the processor 120 ends the fingerprint sensing. If not, the processor 120 executes step S420 to obtain the next swipe frame 310_3. Deduce by analogy, the processor 120 sequentially obtains the swipe frames 310_1-310_P, and before extracting the feature points from the swipe frames 310_1-310_P, the processor 120 first performs the distortion correction on the swipe frames 310_1-310_P to eliminate or reduce the distortion caused by swiping.

Figure 5:
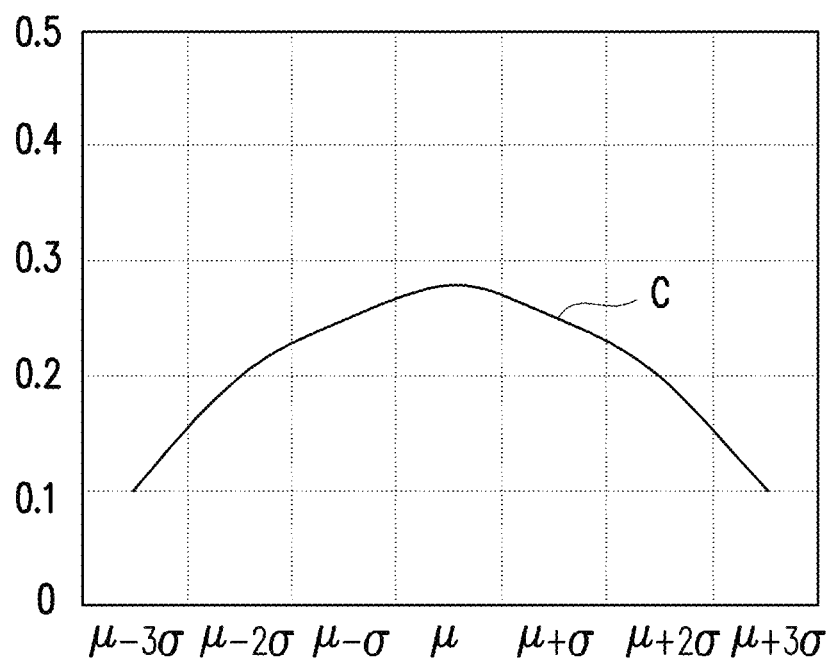
FIG. 5 is a schematic diagram of Gaussian curves according to the embodiment of FIG. 3.

In the embodiment of FIG. 3, the Gaussian curves C1-CP may be the same or different curves. For example, referring to FIG. 5, FIG. 5 is a schematic diagram of the Gaussian curves of the embodiment of FIG. 3. In the embodiment, the Gaussian curves C1-CP may be a curve C shown in FIG. 5. μ is an expectation value, and δ is a standard deviation. In some embodiments, the curve C may be pre-determined according to experiences, experiments and/or statistics in the technical field of fingerprint identification. Alternatively, in other embodiments, the curve C may be determined according to a magnitude of a pressure exerted on the fingerprint sensor 110 by the finger of the user when the user swipes the finger on the fingerprint sensor 110. In other words, when the user exerts a larger pressure on the fingerprint sensor 110, the distortion of the swipe frames is relatively severe, and the fluctuation of the curve C is relatively large. Conversely, when the user exerts a smaller pressure on the fingerprint sensor 110, the distortion of the swipe frames is less severe, and the fluctuation of the curve C is relatively small.

Figure 6:
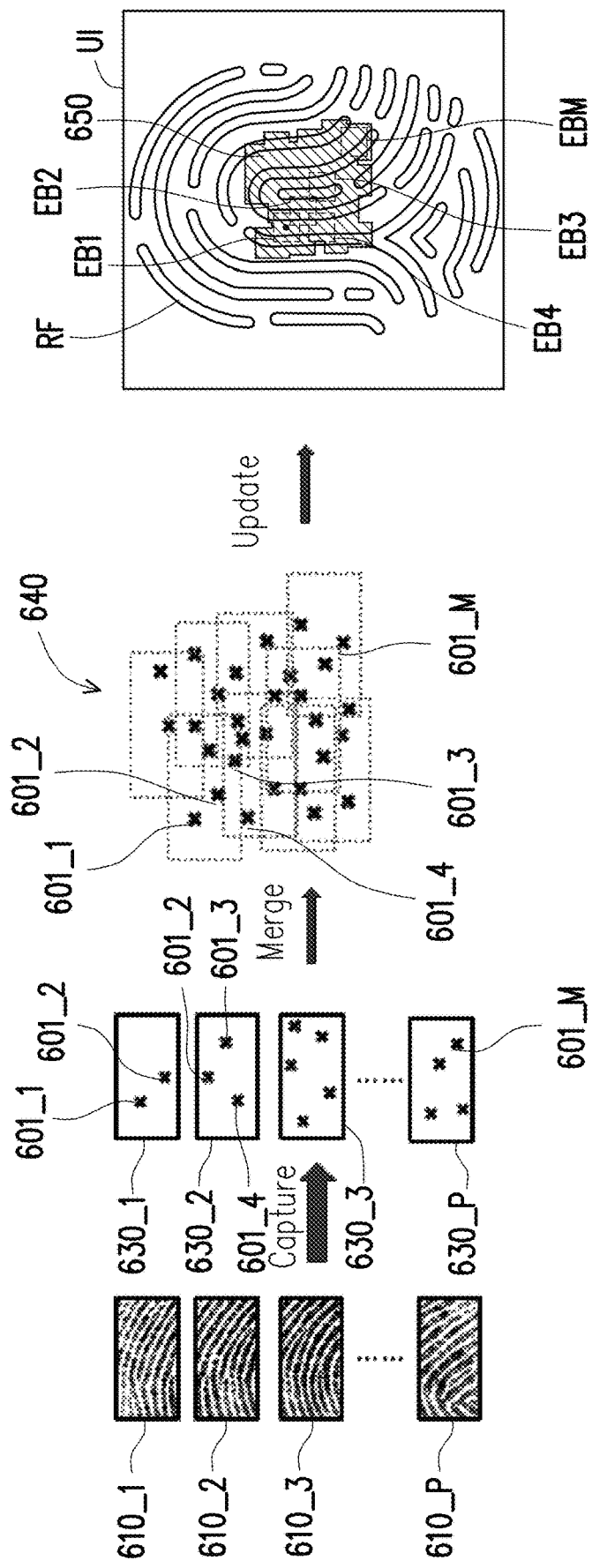
FIG. 6 is a schematic diagram of updating a completion area displayed on a user interface according to an embodiment of the invention.

FIG. 6 is a schematic diagram of updating a completion area displayed on a user interface according to an embodiment of the invention. Referring to FIG. 1 and FIG. 6, the user interface UI includes a fingerprint reference image RF, such that the completion area 650 displayed on the user interface UI may present a fingerprint registration progress with reference to the fingerprint reference image RF. To be specific, in the embodiment, when the electronic device 100 performs fingerprint registration, the user is required to swipe the finger on the fingerprint sensor 110. First, when the user swipes the finger on the fingerprint sensor 110, the fingerprint sensor 110 obtains a first swipe frame 610_1, and the processor 120 analyzes the first swipe frame 610_1 to obtain a plurality of feature points of the first swipe frame 610_1. Then, the fingerprint sensor 110 obtains a second swipe frame 610_2, and the processor 120 analyzes the second swipe frame 610_2 to obtain a plurality of feature points of the second swipe frame 610_2. The method of correcting the swipe frames according to the embodiment of FIG. 3 may be adopted to correct the above swipe frames. In the embodiment, the processor 120 first performs the distortion correction on the swipe frame 610_1. The processor 120 compares the positions of the same feature points in the first swipe frame 610_1 and the second swipe frame 610_2 to obtain a displacement amount and a displacement direction of the same feature point in the first swipe frame 610_1 and the second swipe frame 610_2, so as to produce a motion vector used for correcting the first swipe frame 610_1. Moreover, the processor 120 corrects the first swipe frame 610_1 according to the motion vector and the preset Gaussian curve, so as to generate the corrected first swipe frame.

In the embodiment, the processor 120 analyzes the corrected first swipe frame to obtain a first fingerprint dataset 630_1 having a plurality of corrected feature points 601_1, 601_2. In the embodiment, the processor 120 generates pre-registration data 640 according to the fingerprint dataset 630_1, and the processor 120 displays an expansion block EB1 corresponding to the feature point 601_1 at a preset position of the user interface UI, for example, a center position of the user interface UI to serve as a completion area 650. Then, the processor 120 determines a relative position relationship between the feature point 601_1 and the feature point 601_2, and displays an expansion block EB2 corresponding to the feature point 601_2 on the user interface UI according to the relative position relationship, so as to update a range of the completion area 650.

Then, the fingerprint sensor 110 obtains a third swipe frame 610_3, and performs the distortion correction on the second swipe frame 610_2. In the embodiment, since the first swipe frame 610_1 and the second swipe frame 610_2 have the same feature point 601_2, the processor 120 may obtain the relative position relationship of the first swipe frame 610_1 and the second swipe frame 610_2 through the feature point 601_2. The processor 120 generates a second fingerprint dataset 630_2 according to the feature points 601_2, 601_3 and 601_4. The processor 120 merges the second fingerprint dataset 630_2 into the pre-registration data 640. Moreover, since the feature point 601_2 of the second swipe frame 610_2 and the feature point 601_2 of the first swipe frame 610_1 are the same feature point (i.e. the feature point 601_2 repeatedly appears in the first swipe frame 610_1 and the second swipe frame 610_2), the processor 120 does not repeatedly display the expansion block EB2 corresponding to the feature point 601_2. The processor 120 may determine the relative position relationship between the feature point 601_2 and the feature point 601_3, and accordingly display an expansion block EB3 corresponding to the feature point 601_3 on the user interface UI, so as to expand the range of the completion area 650. Moreover, the processor 120 further displays an expansion block EB4 corresponding to the feature point 601_4 on the user interface UI to update the range of the completion area 650.

Deduced by analogy, the processor 120 may obtain the plurality of swipe frames 610_1-610_P one-by-one when the user's finger swipes on the fingerprint sensor 110, and correct the swipe frames 610_1-610_P one-by-one to generate a plurality of corrected swipe frames. The electronic device 100 may sequentially display a plurality of expansion blocks EB1-EBM corresponding to the feature points 601_1-601_M included in the swipe frames 610_1-610_P on the user interface UI, so as to increase the range of the completion area 650, where M is a positive integer greater than 0. In other words, when the user's finger swipes on the fingerprint sensor 110, the electronic device 100 may update the range of the completion area displayed on the user interface of the display 140 in real-time according to the plurality of feature points of the swipe frames 610_1-610_P sensed by the fingerprint sensor 110, such that the user may learn the real time information of fingerprint registration progress. Moreover, in the embodiment, the processor 120 of the electronic device 100 may obtain the plurality of feature points 601_1-601_M respectively from the plurality of swipe frames 610_1-610_P sensed by the fingerprint sensor 110, and accordingly generate a plurality of fingerprint datasets 630_1-630_P. The processor 120 may merge the fingerprint datasets 630_1-630_P into the pre-registration data 640 (which is, for example, formed by merging a plurality of frames/fingerprint datasets represented by dot lines in FIG. 6). After the fingerprint registration procedure is completed, the processor 120 may take the pre-registration data 640 as fingerprint registration data, and store the same in the memory 130 for later use of fingerprint identification.

Moreover, it should be noted that in the embodiment, one feature point corresponds to one pixel, so that each of the aforementioned expansion blocks EB1-EBM may be a four-square grid, a six-square grid, a nine-square grid, a twelve-square grid or a sixteen-square grid formed by taking the corresponding feature point as a center and expanding outwards by pixels, but the invention is not limited thereto. In an embodiment, the sizes and shapes of the aforementioned expansion blocks EB1-EBM may be correspondingly adjusted or preset according to different display requirements of the user interface.

Figure 7A:
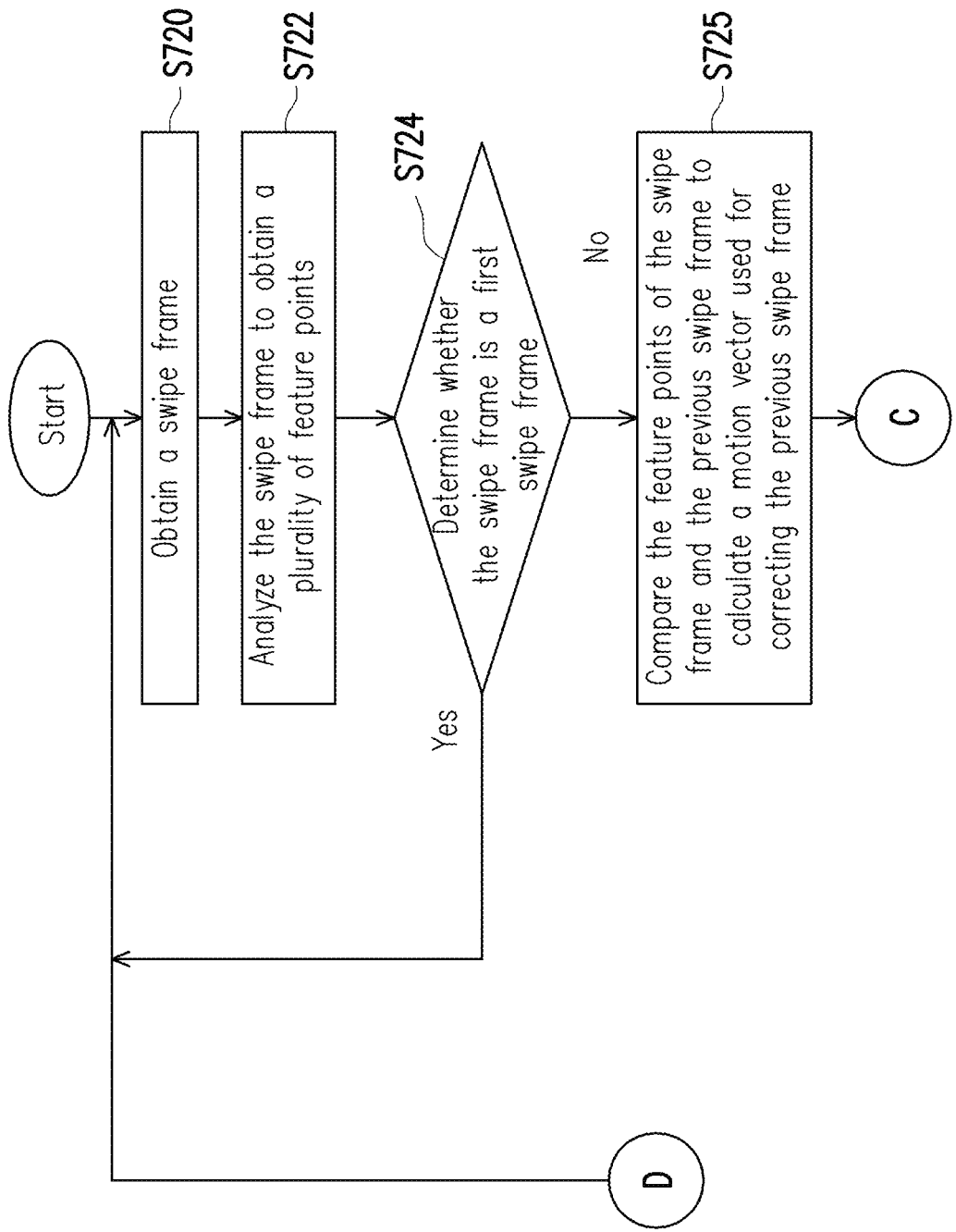
FIG. 7A, FIG. 7B and FIG. 7C are flowcharts illustrating a fingerprint registration method according to a first embodiment of the invention.
Figure 7B:
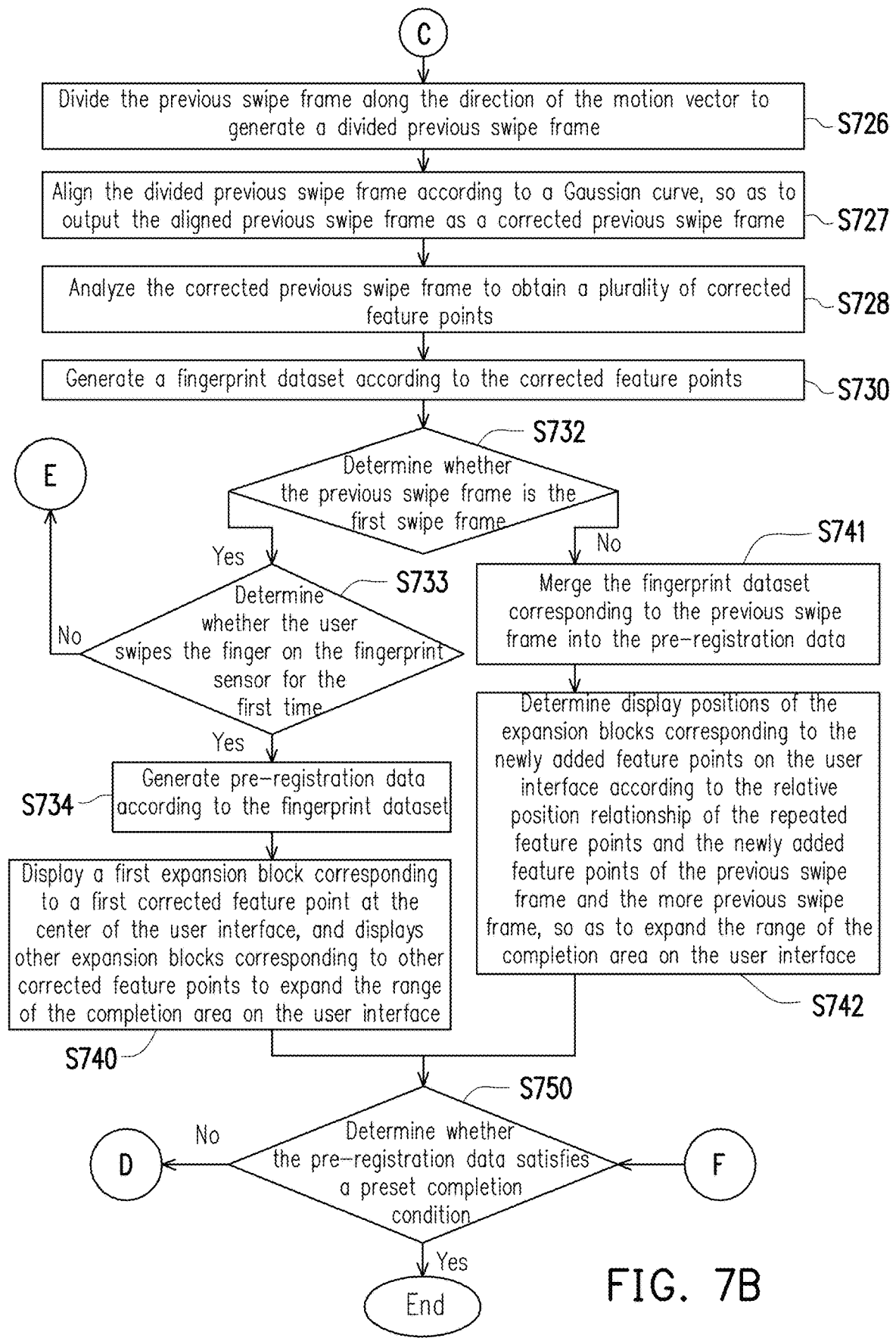
Figure 7C:
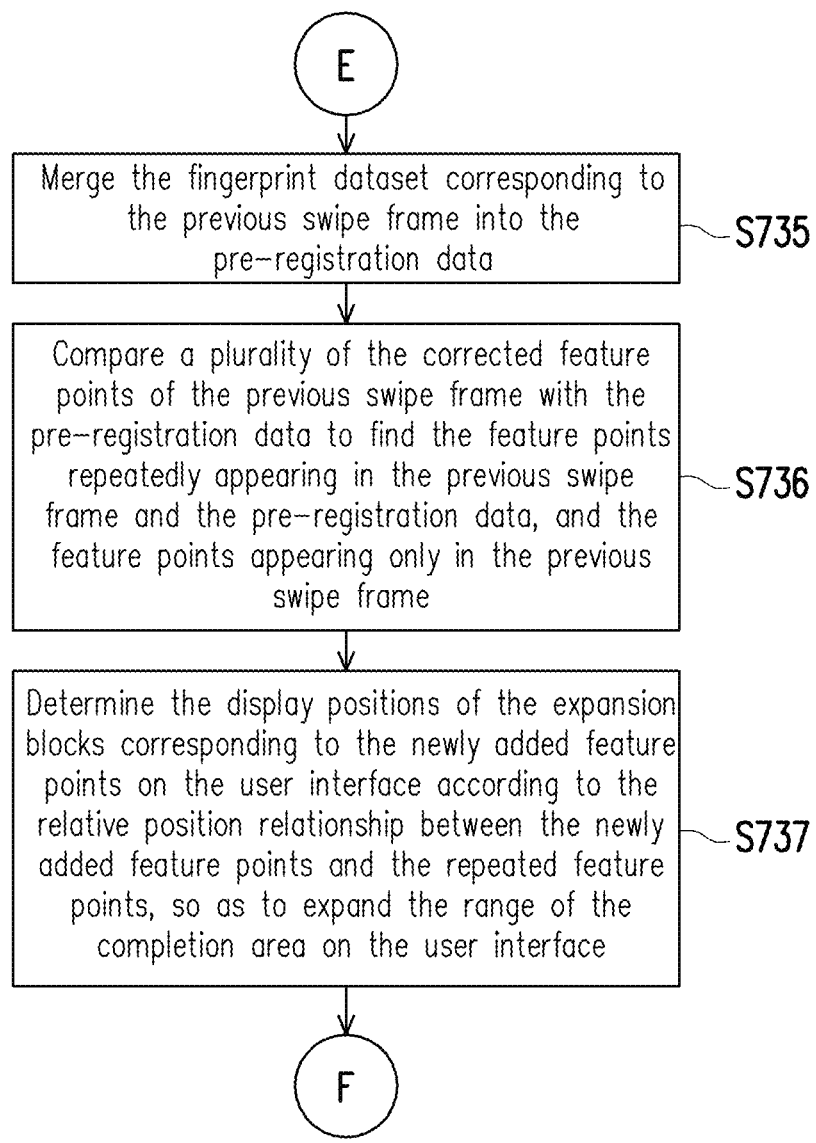

FIG. 7A, FIG. 7B and FIG. 7C are flowcharts illustrating a fingerprint registration method according to a first embodiment of the invention. Referring to FIG. 1, FIG. 6, FIG. 7A, FIG. 7B and FIG. 7C, the electronic device 100 may execute the following steps S720-S750 to implement the operation of updating the completion area displayed on the user interface described in the embodiment of FIG. 6. The following description begins with the obtaining of the first swipe frame. In step S720, the fingerprint sensor 110 obtains the swipe frame 610_1. In step S722, the processor 120 analyzes the swipe frame 610_1 to obtain a plurality of feature points of the swipe frame 610_1. In step S724, the processor 120 determines that the swipe frame 610_1 is the first swipe frame, and the processor 120 executes step S720. In step S720, the processor 120 obtains the swipe frame 610_2. In step S722, the processor 120 analyzes the swipe frame 610_2 to obtain a plurality of feature points of the swipe frame 610_2. In step S724, the processor 120 determines that the swipe frame 610_2 is not the first swipe frame, and executes step S725. In step S725, the processor 120 compares the feature points of the swipe frame 610_2 and the previous swipe frame 610_1 to calculate a motion vector used for correcting the previous swipe frame 610_1. In step S726, the processor 120 divides the previous swipe frame 610_1 along the direction of the motion vector to generate a divided previous swipe frame. In step S727, the processor 120 aligns the divided previous swipe frame according to a Gaussian curve, so as to output the aligned previous swipe frame as a corrected previous swipe frame. In step S728, the processor 120 analyzes the corrected previous swipe frame to obtain a plurality of corrected feature points 601_1 and 601_2.

In step S730, the processor 120 generates a fingerprint dataset according to the corrected feature points 601_1 and 601_2. In step S732, the processor 120 determines whether the previous swipe frame 610_1 is the first swipe frame, and if yes, the processor 120 executes step S733. In step S733, the processor 120 determines whether the user swipes the finger on the fingerprint sensor 110 for the first time, and if yes, the processor 120 executes step S734. In step S734, the processor 120 generates pre-registration data according to the fingerprint dataset, and executes step S740. In step S740, the processor 120 displays a first expansion block corresponding to a first corrected feature point at the center of the user interface UI, and displays other expansion blocks corresponding to other corrected feature points according to a relative position relationship between the current corrected feature point and its preceding corrected feature point, so as to expand the range of the completion area 650 on the user interface UI. Therefore, as shown in FIG. 6, the processor 120 displays the first expansion block EB1 corresponding to the first corrected feature point 601_1 at the center of the user interface UI, and displays the second expansion block EB2 corresponding to the second corrected feature point 601_2 according to a relative position relationship between the second corrected feature point 601_2 and the first corrected feature point 601_1, so as to expand the range of the completion area 650 on the user interface UI. Then, the processor 120 executes step S750.

In step S750, the processor 120 determines whether the pre-registration data 640 satisfies a preset completion condition. If yes, the processor 120 ends the fingerprint sensing and ends the fingerprint registration procedure. If not, the processor 120 executes step S720 to continue the fingerprint sensing. In step S720, the processor 120 obtains the swipe frame 610_3, and executes steps S722-S730. In step S732, the processor 120 determines whether the previous swipe frame 610_2 is the first swipe frame, and if not, the processor 120 executes step S741. In step S741, the processor 120 merges the fingerprint dataset corresponding to the previous swipe frame 610_2 into the pre-registration data 640, and executes step S742. In step S742, the processor 120 determines display positions of the expansion blocks EB3 and EB4 corresponding to the newly added feature points 601_3 and 601_4 on the user interface UI according to the relative position relationship of the repeated feature point 601_2 and the newly added feature points 601_3 and 601_4 of the previous wipe frame 610_2 and the more previous swipe frame 610_1, so as to expand the range of the completion area 650 on the user interface UI.

Deduced by analogy, the processor 120 sequentially obtains the swipe frames 610_1-610_P, and before extracting the feature points of the swipe frames 610_1-610_P, the processor 120 first performs the distortion correction on the swipe frames 610_1-610_P to eliminate or reduce the distortion caused by swiping. Moreover, the electronic device 100 may sequentially obtain a plurality of the swipe frames 610_1-610_P through the fingerprint sensor 110, so as to establish the fingerprint registration data and correspondingly display a real-time registration progress on the user interface UI.

However, in the embodiment, if the user's finger leaves the fingerprint sensor 110 during the process of the fingerprint registration (i.e. the process of swiping the finger), since the fingerprint registration procedure is not yet completed (i.e. the obtained fingerprint data is not yet sufficient), the electronic device 100 generates and displays a reminding message to require the user to again swipe the finger on the fingerprint sensor 110, and the processor 120 executes steps S720 to S732. It is assumed that when the user again swipes the finger, a first and a second swipe frames sensed by the fingerprint sensor 110 are respectively a swipe frame 610_K and a swipe frame 610_K+1, where K is a positive integer between 2 and P. After the swipe frame 610_K+1 is obtained, in step S733, the processor 120 determines whether the user swipes the finger on the fingerprint sensor 110 for the first time, and if not, the processor 120 executes step S735. In step S735, the processor 120 merges the fingerprint dataset corresponding to the previous swipe frame 610_K into the pre-registration data 640. In step S736, the processor 120 compares a plurality of the corrected feature points of the previous swipe frame 610_K with the pre-registration data 640 to find the feature points (which are later referred to as repeated feature points) repeatedly appearing in the previous swipe frame 610_K and the pre-registration data 640, and the feature points (which are later referred to as newly added feature points) appearing only in the previous swipe frame 610_K. In step S737, the processor 120 determines the display positions of the expansion blocks corresponding to the newly added feature points on the user interface UI according to the relative position relationship between the newly added feature points and the repeated feature points, so as to expand the range of the completion area 650 on the user interface UI. Then, the processor 120 executes step S750.

Figure 8:
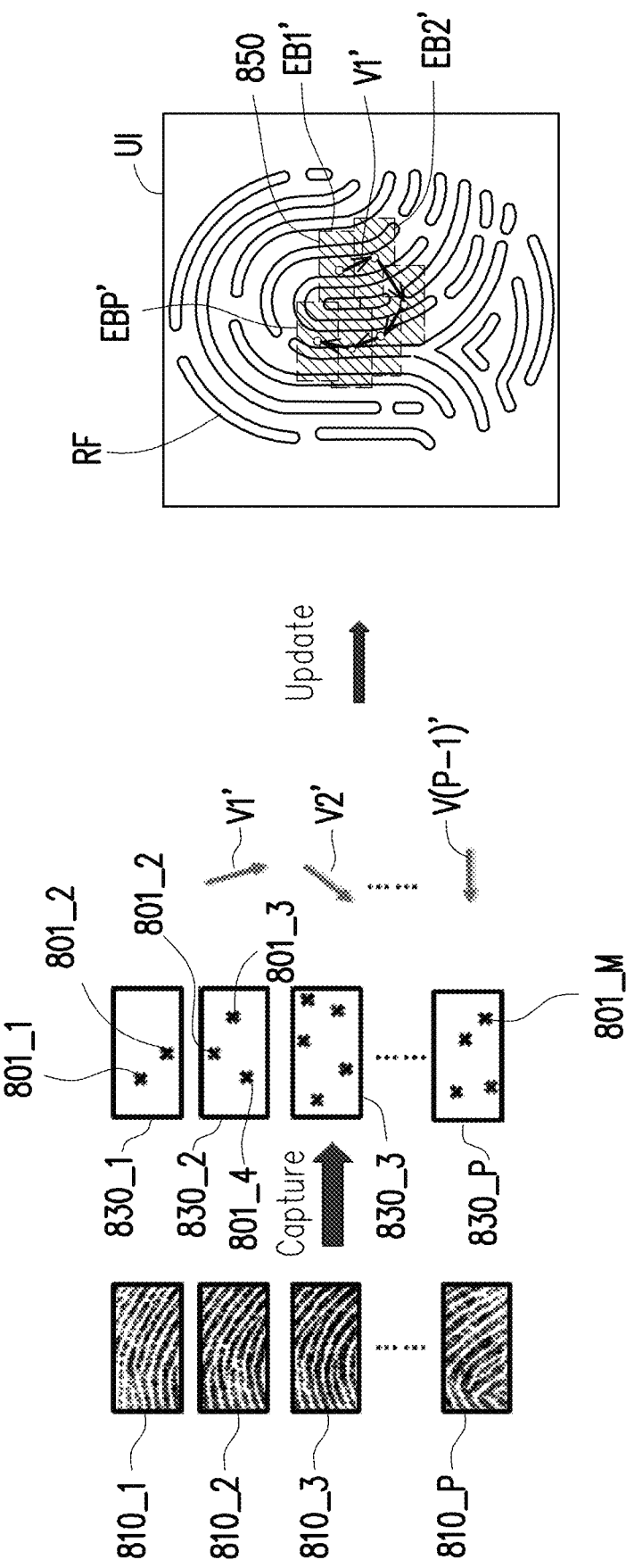
FIG. 8 is a schematic diagram of updating a completion area displayed on the user interface according to another embodiment of the invention.

FIG. 8 is a schematic diagram of updating a completion area displayed on the user interface according to another embodiment of the invention. Referring to FIG. 1 and FIG. 8, the user interface UI includes a fingerprint reference image RF, such that the completion area 840 displayed on the user interface UI may present a fingerprint registration progress with reference to the fingerprint reference image RF. To be specific, in the embodiment, when the electronic device 100 performs fingerprint registration, the user is required to swipe the finger on the fingerprint sensor 110. First, when the user swipes the finger on the fingerprint sensor 110, the fingerprint sensor 110 obtains a first swipe frame 810_1, and the processor 120 analyzes the first swipe frame 810_1 to obtain a plurality of feature points of the first swipe frame 810_1. Then, the fingerprint sensor 110 obtains a second swipe frame 810_2, and the processor 120 analyzes the second swipe frame 810_2 to obtain a plurality of feature points of the second swipe frame 810_2.

The method of correcting the swipe frames according to the embodiment of FIG. 3 may be adopted to correct the first swipe frame 810_1. In the embodiment, the processor 120 first performs distortion correction on the first swipe frame 810_1. The processor 120 compares the positions of the same feature points in the first swipe frame 810_1 and the second swipe frame 810_2 to obtain a displacement amount and a displacement direction of the same feature points in the first swipe frame 810_1 and the second swipe frame 810_2, so as to produce a motion vector used for correcting the first swipe frame 810_1. Moreover, the processor 120 corrects the first swipe frame 810_1 according to the motion vector and the preset Gaussian curve, so as to generate the corrected first swipe frame. In the embodiment, the processor 120 analyzes the corrected first swipe frame to obtain a first fingerprint dataset 830_1 having a plurality of corrected feature points 801_1 and 801_2. In the embodiment, the processor 120 generates pre-registration data (similar to the pre-registration data 640 of FIG. 6) according to the fingerprint dataset 830_1.

In the embodiment, the processor 120 generates a first expansion block EB1' according to the corrected first swipe frame. The processor 120 displays the first expansion block EB1' corresponding to the corrected first swipe frame at a preset position on the user interface UI, for example, at a center of the user interface UI, to serve as the completion area 850. An area of the first expansion block EB1' may be proportional to an area of the corrected first swipe frame or an area of a sensing plane of the fingerprint sensor 110.

Then, the fingerprint sensor 110 obtains a third swipe frame 810_3, and the processor 120 performs the aforementioned distortion correction on the second swipe frame 810_2. The processor 120 analyzes the corrected second swipe frame to obtain a fingerprint dataset 830_2 having feature points 801_2, 801_3 and 801_4, and generates a second expansion block EB2' according to the corrected second swipe frame. In the embodiment, since the first swipe frame 810_1 and the second swipe frame 810_2 have the same feature point 801_2, the processor 120 may determine a relative position relationship between the first swipe frame 810_1 and the second swipe frame 810_2 based on the feature point 801_2, so as to determine a motion vector V1'. The processor 120 determines a relative position relationship between the first expansion block EB1' and the second expansion block EB2' according to the motion vector V1', so as to display the second expansion block EB2' corresponding to the second swipe frame 810_2 on the user interface UI to update the range of the completion area 840. In the embodiment, an area of the second expansion block EB2' is the same as the area of the first expansion block EB1'.

Deduced by analogy, the processor 120 may obtain the plurality of swipe frames 810_1-810_P one-by-one along when the user's finger swipes on the fingerprint sensor 110, and correct the swipe frames 810_1-810_P one-by-one to generate a plurality of corrected swipe frames. The electronic device 100 may calculate a plurality of corresponding motion vectors V1'-V(P−1)' based on the feature points repeatedly appearing in the corrected swipe frames 820_1-820_P. The electronic device 100 may sequentially display expansion blocks EB1'-EBP (where the areas of the expansion blocks EB1'-EBP are the same) corresponding to the swipe frames 810_1-810_P on the user interface UI according to the motion vectors V1'-V(P−1)', so as to update the range of the completion area 850.

However, in some embodiments, if there are a plurality of the same feature points in two successive swipe frames, the processor 120 may obtain an average of the displacement amounts and displacement directions of the same feature points to serve as the motion vector of the preceding swipe frame. Moreover, in other embodiments, the processor 120 may take the displacement amount and the displacement direction of the same feature point repeatedly appearing and having the highest similarity in the two successive swipe frames as the motion vector of the preceding swipe frame.

In brief, when the finger of the user performs a swipe operation on the fingerprint sensor 110 for fingerprint registration, the electronic device 100 may in real time update the range of the completion area displayed on the user interface UI of the display 140 according to the swipe frames 810_1-810_P sensed by the fingerprint sensor 110, such that the user may learn the current fingerprint registration progress in real-time.

Figure 9A:
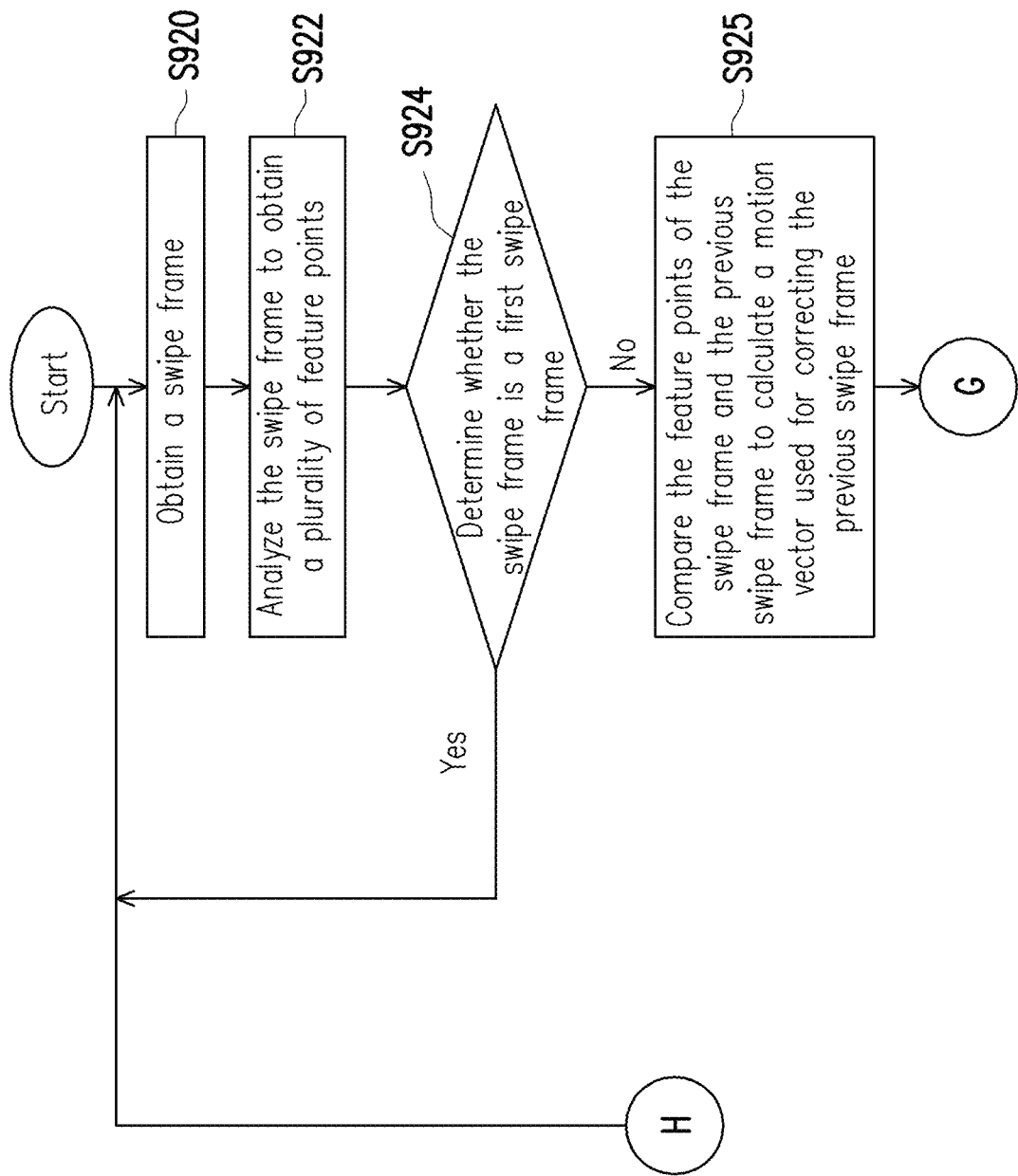
FIG. 9A, FIG. 9B and FIG. 9C are flowcharts illustrating a fingerprint registration method according to a second embodiment of the invention.
Figure 9B:
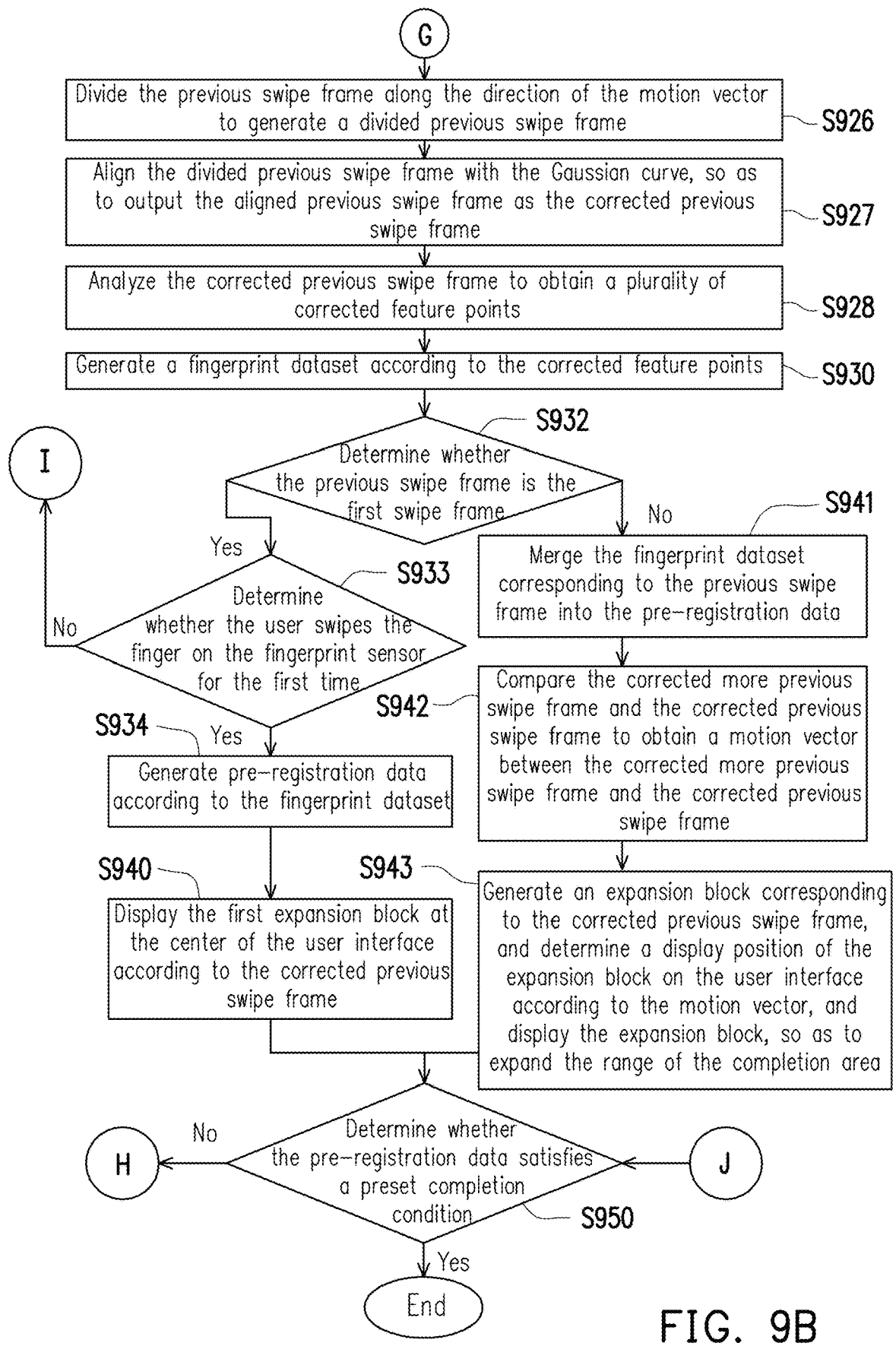
Figure 9C:
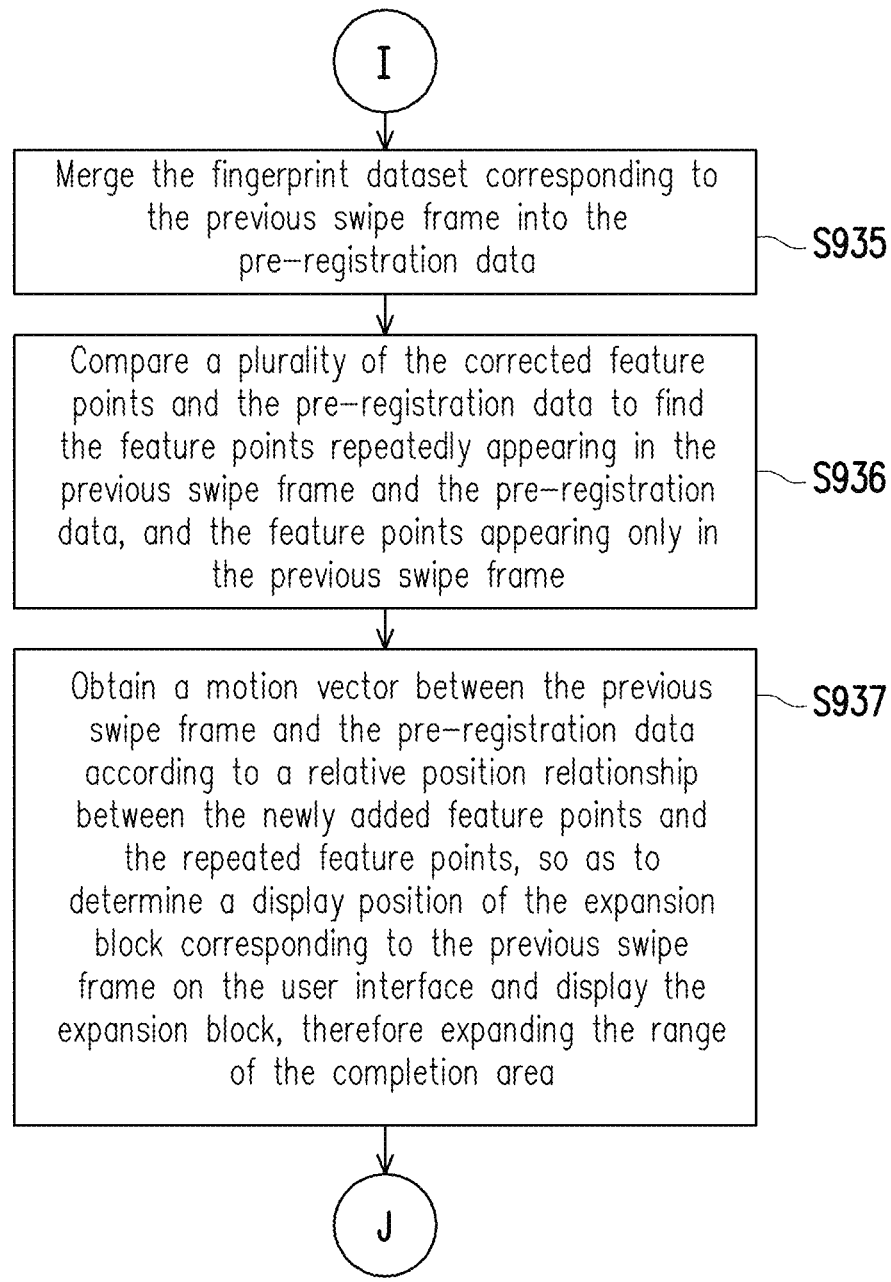

FIG. 9A, FIG. 9B and FIG. 9C are flowcharts illustrating a fingerprint registration method according to a second embodiment of the invention. Referring to FIG. 1, FIG. 8, FIG. 9A, FIG. 9B and FIG. 9C, the electronic device 100 performs the following steps S920-S950 to execute the operation of updating the completion area displayed on the user interface described in the embodiment of FIG. 8. The following description begins with the obtaining of the first swipe frame. In step S920, the fingerprint sensor 110 obtains the swipe frame 810_1. In step S922, the processor 120 analyzes the swipe frame 810_1 to obtain a plurality of feature points of the swipe frame 810_1. In step S924, the processor 120 determines that the swipe frame 810_1 is the first swipe frame, and the processor 120 executes step S920. In step S920, the fingerprint sensor 110 obtains the swipe frame 810_2. In step S922, the processor 120 analyzes the swipe frame 810_2 to obtain a plurality of feature points of the swipe frame 810_2. In step S924, the processor 120 determines that the swipe frame 810_2 is not the first swipe frame, and executes step S925.

In step S925, the processor 120 compares the feature points of the swipe frame 810_2 and the previous swipe frame 810_1 to calculate a motion vector used for correcting the previous swipe frame 810_1. In step S926, the processor 120 divides the previous swipe frame 810_1 along the direction of the motion vector to generate a divided previous swipe frame. In step S927, the processor 120 aligns the divided previous swipe frame according to a Gaussian curve, so as to output the aligned previous swipe frame as a corrected previous swipe frame. In step S928, the processor 120 analyzes the corrected previous swipe frame to obtain a plurality of corrected feature points 801_1 and 801_2.

In step S930, the processor 120 generates a fingerprint dataset 830_1 according to the corrected feature points 801_1 and 801_2. In step S932, the processor 120 determines whether the previous swipe frame 810_1 is the first swipe frame, and if yes, the processor 120 executes step S933. In step S933, the processor 120 determines whether the user swipes the finger on the fingerprint sensor 110 for the first time, and if yes, the processor 120 executes step S934. In step S934, the processor 120 generates pre-registration data according to the fingerprint dataset 830_1. In step S940, the processor 120 displays the first expansion block EB1' at the center of the user interface UI according to the corrected previous swipe frame 810_1. Then, the processor 120 executes step S950. In step S950, the processor 120 determines whether the pre-registration data satisfies a preset completion condition. If yes, the processor 120 ends the fingerprint sensing. If not, the processor 120 executes step S920 and continues the fingerprint sensing.

After obtaining the swipe frame 810_3, in step S932, the processor 120 determines whether the previous swipe frame 810_2 is the first swipe frame, and if not, the processor 120 executes step S941. In step S941, the processor 120 merges the fingerprint dataset corresponding to the previous swipe frame 810_2 into the pre-registration data. In step S942, the processor 120 compares the corrected more previous swipe frame 810_1 and the corrected previous swipe frame 810_2 to obtain a motion vector V1' between the corrected more previous swipe frame 810_1 and the corrected previous swipe frame 810_2. In step S943, the processor 120 generates an expansion block EB2' corresponding to the corrected previous swipe frame 810_2, and determines a display position of the expansion block EB2' on the user interface UI according to the motion vector V1', and displays the expansion block EB2', so as to expand the range of the completion area 850. Then, the processor 120 executes step S950.

In step S950, the processor 120 determines whether the pre-registration data satisfies the preset completion condition. If yes, the processor 120 ends the fingerprint sensing. If not, the processor 120 executes step S920 to continue the fingerprint sensing. Deduced by analogy, the processor 120 sequentially obtains the swipe frames 810_1-810_P, and before extracting the feature points from the swipe frames 810_1-810_P, the processor 120 first performs the distortion correction on the swipe frames 810_1-810_P to eliminate or reduce the distortion caused by swiping. Therefore, the electronic device 100 may sequentially obtain a plurality of the swipe frames 810_1-810_P through the fingerprint sensor 110, so as to generate the fingerprint registration data, and correspondingly display a real-time registration progress on the user interface UI.

However, in the embodiment, if the user's finger leaves the fingerprint sensor 110 during the process of fingerprint registration (i.e. the process of swiping the finger), and the fingerprint registration is not yet completed (i.e. the obtained fingerprint data is not yet sufficient), the electronic device 100 generates and displays a reminding message to require the user to again swipe the finger on the fingerprint sensor 110, and the processor 120 executes steps S920 to S932. It is assumed that when the user again swipes the finger, a first and a second swipe frames sensed by the fingerprint sensor 110 are respectively a swipe frame 810_K and a swipe frame 810_K+1, where K is a positive integer between 2 and P. In step S932, the processor 120 determines that the previous swipe frame 810_K is the first swipe frame, and the processor 120 executes step S933. In step S933, the processor 120 determines whether the user swipes the finger on the fingerprint sensor 110 for the first time, and if not, the processor 120 executes step S935. In step S935, the processor 120 merges the fingerprint dataset corresponding to the previous swipe frame 810_K into the pre-registration data. In step S936, the processor 120 compares a plurality of the corrected feature points of the previous swipe frame 810_K and the pre-registration data to find the feature points (which are referred to as repeated feature points) repeatedly appearing in the previous swipe frame 810_K and the pre-registration data, and the feature points (which are referred to as newly added feature points) appearing only in the previous swipe frame 810_K. In step S937, the processor 120 obtains a motion vector between the previous swipe frame 810_K and the pre-registration data according to a relative position relationship between the newly added feature points and the repeated feature points, so as to determine a display position of the expansion block corresponding to the previous swipe frame 810_K on the user interface UI and display the expansion block, therefore expanding the range of the completion area 850. Then, the processor 120 executes step S950.

Figure 10A:
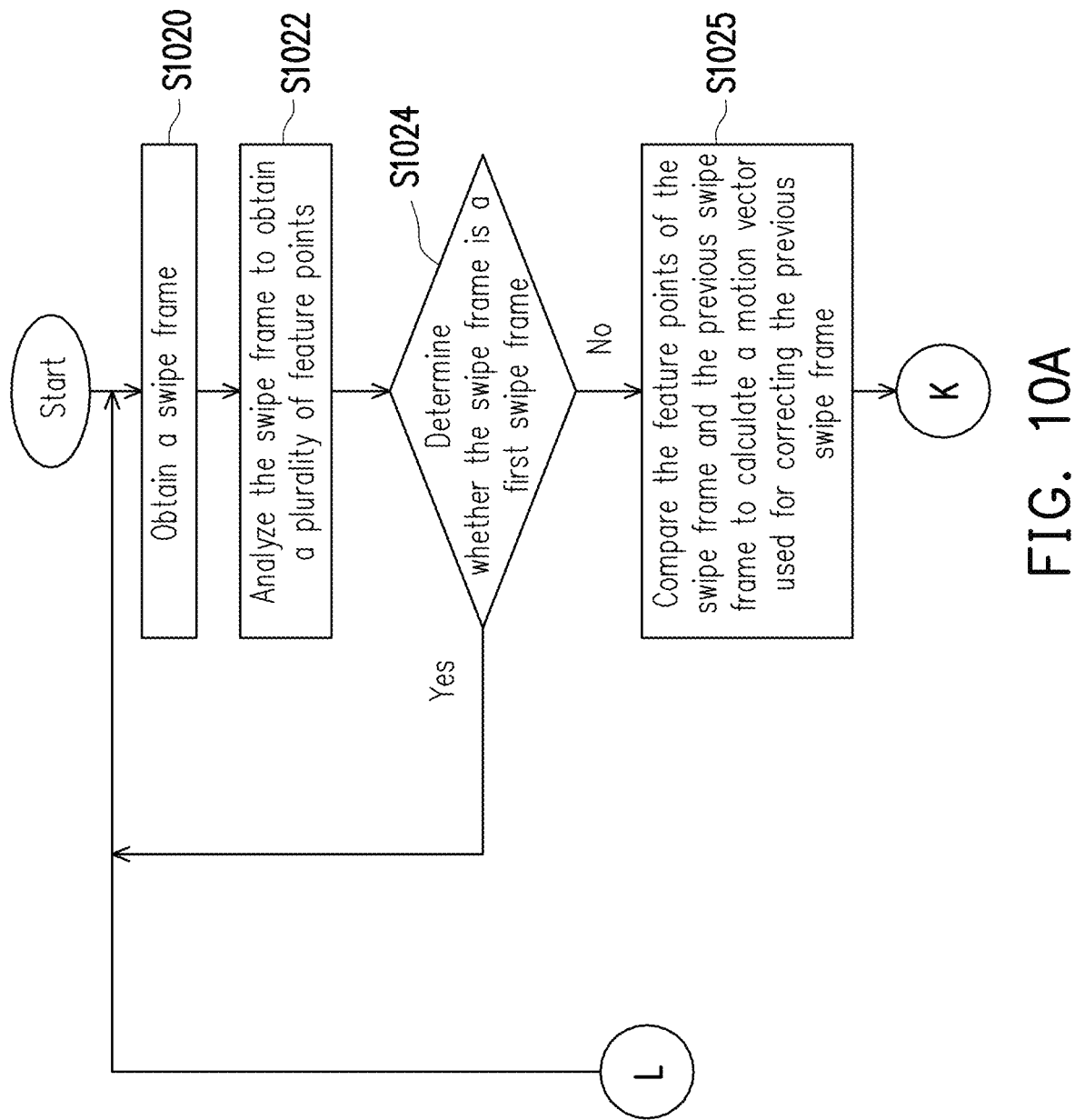
FIG. 10A, FIG. 10B and FIG. 10C are flowcharts illustrating a fingerprint registration method according to a third embodiment of the invention.
Figure 10B:
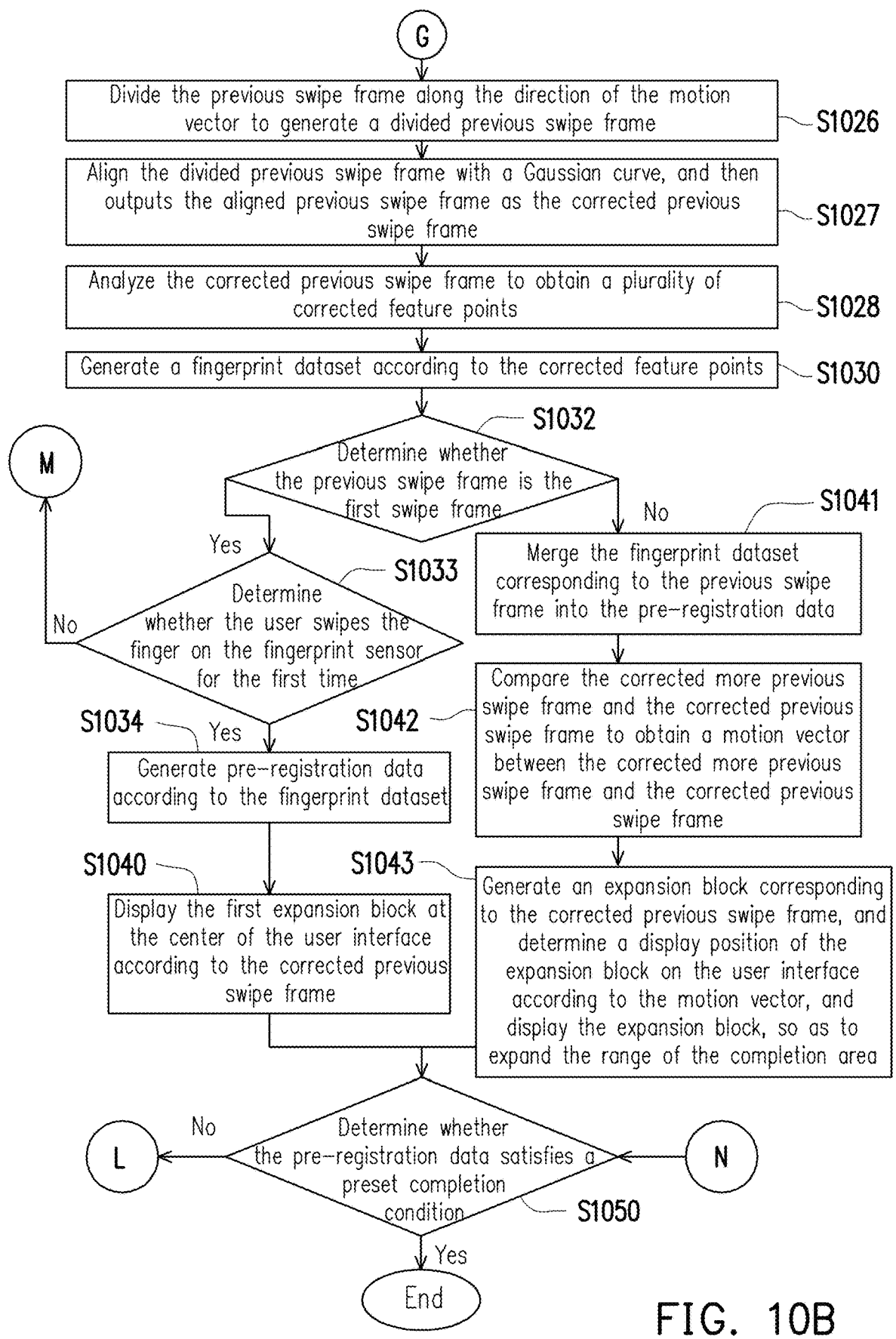
Figure 10C:
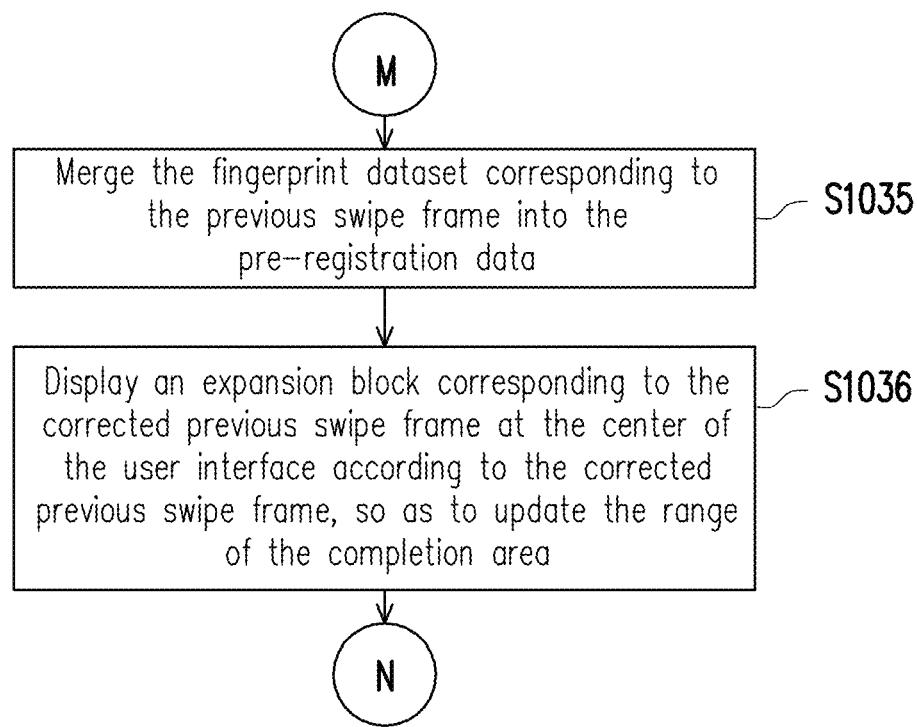

FIG. 10A, FIG. 10B and FIG. 10C are flowcharts illustrating a fingerprint registration method according to a third embodiment of the invention. Referring to FIG. 1, FIG. 8, FIG. 10A, FIG. 10B and FIG. 10C, the electronic device 100 may execute the following steps S1020-1050 to implement the operation of updating the completion area displayed on the user interface described in the embodiment of FIG. 8.

The following description begins with the obtaining of the first swipe frame. In step S1020, the fingerprint sensor 110 obtains the swipe frame 810_1. In step S1022, the processor 120 analyzes the swipe frame 810_1 to obtain a plurality of feature points of the swipe frame 810_1. In step S1024, the processor 120 determines that the swipe frame 810_1 is the first swipe frame, and the processor 120 executes step S1020. In step S1020, the processor 120 obtains the swipe frame 810_2. In step S1022, the processor 120 analyzes the swipe frame 810_2 to obtain a plurality of feature points of the swipe frame 810_2. In step S1024, the processor 120 determines that the swipe frame 810_2 is not the first swipe frame, so that the processor 120 executes step S1025.

In step S1025, the processor 120 compares the feature points of the swipe frame 810_2 and the previous swipe frame 810_1 to calculate a motion vector used for correcting the previous swipe frame 810_1. In step S1026, the processor 120 divides the previous swipe frame 810_1 along the direction of the motion vector to generate a divided previous swipe frame. In step S1027, the processor 120 aligns the divided previous swipe frame according to a Gaussian curve, and then outputs the aligned previous swipe frame as a corrected previous swipe frame. In step S1028, the processor 120 analyzes the corrected previous swipe frame to obtain a plurality of corrected feature points 801_1 and 801_2.

In step S1030, the processor 120 generates a fingerprint dataset 830_1 according to the corrected feature points 801_1 and 801_2. In step S1032, the processor 120 determines whether the previous swipe frame 810_1 is the first swipe frame, and if yes, the processor 120 executes step S1033. In step S1033, the processor 120 determines whether the user swipes the finger on the fingerprint sensor 110 for the first time, and if yes, the processor 120 executes step S1034. In step S1034, the processor 120 generates pre-registration data according to the fingerprint dataset 830_1. In step S1040, the processor 120 displays a first expansion block EB1' at the center of the user interface UI according to the corrected previous swipe frame. Then, the processor 120 executes step S1050. In step S1050, the processor 120 determines whether the pre-registration data satisfies the preset completion condition. If yes, the processor 120 ends the fingerprint sensing. If not, the processor 120 goes to step S1020 to continue the fingerprint sensing.

After obtaining the swipe frame 810_3, in step S1032, the processor 120 determines whether the previous swipe frame 810_2 is the first swipe frame, and if not, the processor 120 executes step S1041. In step S1041, the processor 120 merges the fingerprint dataset corresponding to the previous swipe frame 810_2 into the pre-registration data. In step S1042, the processor 120 compares the corrected more previous swipe frame 810_1 and the corrected previous swipe frame 810_2 to obtain a motion vector V1' between the corrected more previous swipe frame 810_1 and the corrected previous swipe frame 810_2. In step S1043, the processor 120 generates an expansion block EB2' corresponding to the corrected previous swipe frame 810_2, and determines a display position of the expansion block EB2' on the user interface UI according to the motion vector V1', and displays the expansion block EB2', so as to expand the range of the completion area 850. Then, the processor 120 executes step S1050.

In step S1050, the processor 120 determines whether the pre-registration data satisfies the preset completion condition. If yes, the processor 120 ends the fingerprint sensing. If not, the processor 120 executes step S1020 to continue the fingerprint sensing. Deduced by analogy, the processor 120 sequentially obtains the swipe frames 810_1-810_P, and before extracting the feature points from the swipe frames 810_1-810_P, the processor 120 first performs the distortion correction on the swipe frames 810_1-810_P to eliminate or reduce the distortion caused by swiping. Therefore, the electronic device 100 may sequentially obtain the swipe frames 810_1-810_P through the fingerprint sensor 110, so as to generate the fingerprint registration data, and correspondingly display a real-time registration progress on the user interface UI.

However, in the embodiment, if the user's finger leaves the fingerprint sensor 110 during the process of fingerprint registration (i.e. the process of swiping the finger) and the fingerprint registration is not yet completed (i.e. the obtained fingerprint data is not yet sufficient), the electronic device 100 generates and displays a reminding message to require the user to again swipe the finger on the fingerprint sensor 110, and the processor 120 executes steps S1020 to S1032. It is assumed that when the user again swipes the finger, a first and a second swipe frames sensed by the fingerprint sensor 110 are respectively a swipe frame 810_K and a swipe frame 810_K+1, where K is a positive integer between 2 and P. In step S1032, the processor 120 determines that the previous swipe frame 810_K is the first swipe frame, and the processor 120 executes step S1033. In step S1033, the processor 120 determines whether the user swipes the finger on the fingerprint sensor 110 for the first time, and if not, the processor 120 executes step S1035. In step S1035, the processor 120 merges the fingerprint dataset corresponding to the previous swipe frame 810_K into the pre-registration data. In step S1036, the processor 120 displays an expansion block corresponding to the corrected previous swipe frame at the center of the user interface UI according to the corrected previous swipe frame, so as to update the range of the completion area 850. Then, the processor 120 executes step S1050.

In summary, compared to the conventional fingerprint registration, the fingerprint registration method and the electronic device using the fingerprint registration method of the invention are adapted to calculate a plurality of motion vectors respectively for a plurality of swipe frames sensed by the fingerprint sensor and correct the swipe frames respectively according to the motion vectors, so as to ameliorate fingerprint deformation. Moreover, the fingerprint registration method and the electronic device using the fingerprint registration method of the invention are adapted to display the expansion blocks corresponding to the swipe frames on the user interface UI to update the range of the completion area on the user interface UI in real-time, so that the electronic device may provide the user with the real-time information of fingerprint registration progress.

The term "an embodiment" or "embodiment" mentioned throughout the specification means that the specific features, structures or characteristics described with reference of the embodiments are included in at least one embodiment of the invention, but does not imply that they are included in each of the embodiments. Therefore, the phrase "in an embodiment" or "in the embodiment" appeared at different locations throughout the specification does not necessarily refer to the same embodiment of the invention.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A fingerprint registration method, adapted to an electronic device to execute a fingerprint registration procedure to generate registration data of a fingerprint, wherein the electronic device comprises a processor, a fingerprint sensor and a display, the fingerprint registration method comprising:
   sequentially obtaining a plurality of swipe frames of the fingerprint by the fingerprint sensor;
   sequentially analyzing the swipe frames by the processor to obtain a plurality of feature points of the swipe frames;
   sequentially merging the feature points of the swipe frames into pre-registration data by the processor;
   sequentially updating a completion area displayed on a user interface of the display by the processor according to relative position relationships of the feature points of the swipe frames; and
   determining whether the pre-registration data satisfies a preset completion condition by the processor, so as to determine whether to end the fingerprint registration procedure,
   wherein in the step of sequentially merging the feature points of the swipe frames into the pre-registration data by the processor, for each of the swipe frames, the processor executes the following steps:
   comparing the feature points of the swipe frame and the feature points of a corresponding previous swipe frame by the processor to calculate a motion vector;
   dividing the previous swipe frame along a direction of the motion vector by the processor to generate a plurality of sub-swipe frames;
   aligning the sub-swipe frames by the processor according to a Gaussian curve corresponding to the previous swipe frame, so as to correct the previous swipe frame;
   analyzing the corrected previous swipe frame by the processor to obtain a plurality of feature points of the corrected previous swipe frame;
   generating a fingerprint dataset by the processor according to the feature points of the corrected previous swipe frame; and
   merging the fingerprint dataset of the previous swipe frame into the pre-registration data by the processor.

2. The fingerprint registration method as claimed in claim 1, wherein in the step of updating the completion area displayed on the user interface of the display by the processor according to the relative position relationships of the feature points of the swipe frames, for each of the swipe frames, the processor executes a following step:
   according to each of the feature points of the swipe frame, generating an expansion block corresponding to the feature point and displaying the same on the user interface by the processor, so as to update the completion area,
   wherein a display position of the expansion block on the user interface is determined according to a relative position relationship between the current feature point and another feature point in the pre-registration data.

3. The fingerprint registration method as claimed in claim 2, wherein the current feature point and the other feature point are in a same fingerprint dataset.

4. The fingerprint registration method as claimed in claim 1, wherein in the step of sequentially updating the completion area displayed on the user interface of the display by the processor according to the relative position relationships of the feature points of the swipe frames, for each of the swipe frames, the processor executes the following steps:

comparing the feature points of the swipe frame and the feature points of a corresponding previous swipe frame by the processor to find the feature points repeatedly appearing in the swipe frame and the corresponding previous swipe frame, and calculating a displacement amount and a displacement direction of the repeatedly appearing feature points to obtain a motion vector between the swipe frame and the corresponding previous swipe frame; and determining a display position of an expansion block corresponding to the swipe frame on the user interface by the processor according to the motion vector of the swipe frame and displaying the expansion block, so as to update the completion area.

5. The fingerprint registration method as claimed in claim 1, wherein in the step of sequentially updating the completion area displayed on the user interface of the display by the processor according to the relative position relationships of the feature points of the swipe frames, for each of the swipe frames, the processor executes the following steps:

comparing a fingerprint dataset of the swipe frame and the pre-registration data by the processor, so as to obtain a motion vector of the fingerprint dataset relative to the pre-registration data; and displaying an expansion block corresponding to the swipe frame on the user interface by the processor according to the motion vector, so as to update the completion area.

6. An electronic device capable of performing a process of fingerprint registration, comprising:

a fingerprint sensor, configured to sequentially obtain a plurality of swipe frames of a finger object;

a processor, coupled to the fingerprint sensor, and configured to sequentially analyze the swipe frames to obtain a plurality of feature points of the swipe frames; and a display, coupled to the processor, wherein the processor sequentially merges the feature points of the swipe frames into pre-registration data, the processor sequentially updates a completion area displayed on a user interface of the display according to relative position relationships of the feature points of the swipe frames, and the processor determines whether the pre-registration data satisfies a preset completion condition, so as to determine whether to end the process of fingerprint registration, wherein for each of the swipe frames, the processor compares the feature points of the swipe frame and the feature points of a corresponding previous swipe frame to calculate a motion vector, the processor divides the previous swipe frame along a direction of the motion vector to generate a plurality of sub-swipe frames, the processor aligns the sub-swipe frames according to a Gaussian curve corresponding to the previous swipe frame, so as to correct the previous swipe frame, the processor analyzes the corrected previous swipe frame to obtain a plurality of feature points of the corrected previous swipe frame, the processor generates a fingerprint dataset according to the feature points of the corrected previous swipe frame, and the processor merges the fingerprint dataset of the previous swipe frame into the pre-registration data.

7. The electronic device as claimed in claim 6, wherein for each of the swipe frames, according to each of the feature points of the swipe frame, the processor generates an expansion block corresponding to the feature point and displays the same on the user interface, so as to update the completion area, and wherein a display position of the expansion block on the user interface is determined according to a relative position relationship between the current feature point and another feature point in the pre-registration data.

8. The electronic device as claimed in claim 7, wherein the current feature point and the other feature point are in the same fingerprint dataset.

9. The electronic device as claimed in claim 6, wherein for each of the swipe frames, the processor compares the feature points of the swipe frame and the feature points of a corresponding previous swipe frame to find the feature points repeatedly appearing in the swipe frame and the corresponding previous swipe frame, and calculates a displacement amount and a displacement direction of the repeatedly appearing feature points to obtain a motion vector between the swipe frame and the corresponding previous swipe frame, and the processor determines a display position of an expansion block corresponding to the swipe frame on the user interface according to the motion vector of the swipe frame and displays the expansion block, so as to update the completion area.

10. The electronic device as claimed in claim 6, wherein for each of the swipe frames, the processor compares a fingerprint dataset of the swipe frame and the pre-registration data to obtain a motion vector of the fingerprint dataset relative to the pre-registration data, and the processor displays an expansion block corresponding to the swipe frame on the user interface according to the motion vector, so as to update the completion area.

* * * * *